United States Patent [19]

Kaempen

[11] Patent Number: 5,222,769
[45] Date of Patent: Jun. 29, 1993

[54] DOUBLE-WALL COMPOSITE PIPE AND COUPLING STRUCTURE ASSEMBLY

[76] Inventor: Charles E. Kaempen, 3202 Larkstone Dr., Orange, Calif. 92699

[21] Appl. No.: 838,463

[22] Filed: Feb. 26, 1992

[51] Int. Cl.[5] .......................................... F16L 11/08
[52] U.S. Cl. ..................... 285/45; 285/93; 285/373; 285/379; 285/423; 138/128; 138/141; 138/153
[58] Field of Search ................... 285/423, 45, 93, 373, 285/24, 379; 138/125, 137, 141, 153

[56] References Cited

U.S. PATENT DOCUMENTS

| | | | |
|---|---|---|---|
| 3,422,855 | 1/1969 | Weyer | 138/141 |
| 3,575,789 | 4/1971 | Siefert et al. | 161/193 |
| 3,784,441 | 1/1974 | Kaempen | 161/58 |
| 3,812,885 | 5/1974 | Sajben et al. | 138/125 |
| 3,850,203 | 11/1974 | Shobert | 138/125 |
| 3,946,127 | 3/1976 | Eisenmann et al. | 428/48 |
| 4,065,340 | 12/1977 | Dickerson | 156/154 |
| 4,139,025 | 2/1974 | Carlstrom | 138/153 |
| 4,206,574 | 4/1981 | Loyd et al. | 428/113 |
| 4,289,172 | 9/1981 | Ekstrom | 138/141 X |
| 4,309,473 | 1/1982 | Minamisawa et al. | 428/292 |
| 4,419,400 | 12/1983 | Hindersinn | 428/245 |
| 4,496,621 | 1/1985 | Hubert et al. | 428/236 |
| 4,740,422 | 4/1988 | Kaempen | 428/375 |
| 4,767,656 | 8/1988 | Chee et al. | 428/116 |
| 4,820,567 | 4/1989 | Scola et al. | 428/105 |
| 4,874,661 | 10/1989 | Browne et al. | 428/246 |
| 4,888,247 | 12/1989 | Zweben et al. | 428/105 |
| 4,907,624 | 3/1990 | Jonasson | 138/125 |
| 4,917,938 | 4/1990 | Mohan | 428/215 |
| 4,957,801 | 9/1990 | Maranci | 428/147 |
| 4,961,990 | 10/1990 | Yamada | 428/240 |

OTHER PUBLICATIONS

Cooper et al, "Multiple–Composite," Journal of Materials Science, 1972, pp. 325-333.
Sambell et al, "Carbon–Matrices" Journal of Materials Science, 1972, pp. 663-681.
Phillips "Interfacial–Glass–Ceramics" Journal of Materials Science, 1974, pp. 1847-1854.
Aveston et al, "Fibre Reinforced–Specifications" Composites–Standards, Testing and Design, Apr. 8, 1974, pp. 93-103.
Kelly, "Some Scientific–Composites" Composites–Standards, Testing and Design, Apr. 8, 1974, pp. 9-16.
Donald et al, "Ceramic–Matrix Composites" Journal of Materials Science, 1976, pp. 949-972.
Brennan et al, "Silicon Carbide–Toughness" Journal of Materials Science, 1982, pp. 2371-2383.
Evans et al, "Some Structural–Composites" 5th International Con. on Composite Materials, Jul. 29, 1985, pp. 543-553.
Marshall et al "Tensile Failure–Composites" 5th International Con. on Composite Materials, Jul. 29, 1985, pp. 557-568.
Marshall et al, "The Tensile-Reinforced" Fracture Mechanics of Ceramics, vol. 7, 1986, pp. 1-15.
Marshall et al, "Reliability–Composites", Ceramic Bulletin, vol. 66, No. 2, 1987, pp. 309-317.
Marshall et al, "Measurement–Composites" Journal of the American Ceramic Society, vol. 70, Aug. 1987, pp. 542-548.

Primary Examiner—Dave W. Arola
Attorney, Agent, or Firm—Phillips, Moore, Lempio & Finley

[57] ABSTRACT

A double-wall composite pipe comprises a permeable annulus structure separating impermeable inner and outer walls. The permeable annulus structure has micro-fractures formed therein that function to reduce the flow rate and pressure of fluids leaking through the inner wall to thus inhibit fluid leakage. The annulus structure resists the stresses produced by internal fluid pressures and other service loads. The inner and outer walls will remain permanently impermeable while the pipe annulus structure undergoes stress-induced dimensional changes. A coupler assembly mechanically connects each longitudinally adjacent pair of pipes together and comprises two semi-cylindrical half-couplers, a compressible seal ring, a cylindrical retaining sleeve, and a flexible boot that encloses and seals the assembled half-couplers. A leak detecting sensor may be located at the coupler assembly. A preferred method and apparatus for making the pipe and coupler assembly are also taught.

28 Claims, 15 Drawing Sheets

FIG. 1

| PIPE DIAMETER | | TOTAL WALL THICKNESS | | | |
|---|---|---|---|---|---|
| | | 0.15 inch (3.8 mm) | 0.20 inch (5.1mm) | 0.30 inch (7.6 mm) | 0.40 inch (10.2 mm) |
| | | MAXIMUM TEST PRESSURE NOTE: 145 PSI = 1 MPa | | | |
| 2 in. | 51 mm | 2,000 psi | 3,200 psi | 4,000 psi | 5,333 psi |
| 3 in. | 76 mm | 1,556 psi | 2,489 psi | 3,111 psi | 4,148 psi |
| 4 in. | 102 mm | 1,273 psi | 2,036 psi | 2,545 psi | 3,394 psi |
| 6 in. | 152 mm | 933 psi | 1,493 psi | 1,867 psi | 2,489 psi |
| 8 in. | 203 mm | 737 psi | 1,179 psi | 1,474 psi | 1,965 psi |
| 10 in. | 254 mm | 609 psi | 974 psi | 1,217 psi | 1,623 psi |
| 12 in. | 305 mm | 519 psi | 830 psi | 1,037 psi | 1,383 psi |
| 14 in. | 355 mm | 452 psi | 723 psi | 903 psi | 1,204 psi |
| 16 in. | 406 mm | 400 psi | 640 psi | 800 psi | 1,067 psi |
| 18 in. | 457 mm | 359 psi | 574 psi | 718 psi | 957 psi |
| 20 in. | 508 mm | 326 psi | 521 psi | 651 psi | 868 psi |
| 24 in. | 609 mm | 275 psi | 439 psi | 549 psi | 732 psi |
| 30 in. | 761 mm | 222 psi | 356 psi | 444 psi | 593 psi |
| 36 in. | 914 mm | 187 psi | 299 psi | 373 psi | 498 psi |
| 42 in. | 1066 mm | 161 psi | 257 psi | 322 psi | 429 psi |
| 48 in. | 1218 mm | 141 psi | 226 psi | 283 psi | 377 psi |
| 52 in. | 1320 mm | 131 psi | 209 psi | 262 psi | 349 psi |
| 60 in. | 1523 mm | 114 psi | 182 psi | 228 psi | 304 psi |
| 66 in. | 1675 mm | 104 psi | 166 psi | 207 psi | 277 psi |
| 72 in. | 1827 mm | 95 psi | 152 psi | 190 psi | 254 psi |
| 84 in. | 2132 mm | 82 psi | 131 psi | 164 psi | 218 psi |
| 96 in. | 2436 mm | 72 psi | 115 psi | 144 psi | 191 psi |
| 108 in. | 2741 mm | 64 psi | 102 psi | 128 psi | 170 psi |
| 120 in. | 3046 mm | 58 psi | 92 psi | 115 psi | 154 psi |

FIG. 2

| PIPE DIAMETER | | TOTAL WALL THICKNESS | | | |
|---|---|---|---|---|---|
| | | 0.50 inch (12.7 mm) | 0.63 inch (16.0 mm) | 0.75 inch (19.0 mm) | 1.00 inch (25.38 mm) |
| | | MAXIMUM TEST PRESSURE NOTE: 145 PSI = 1 MPa | | | |
| 2 in. | 51 mm | 6,306 psi | 7,384 psi | 8,333 psi | 9,929 psi |
| 3 in. | 76 mm | 4,965 psi | 5,892 psi | 6,731 psi | 8,187 psi |
| 4 in. | 102 mm | 4,094 psi | 4,902 psi | 5,645 psi | 6,965 psi |
| 6 in. | 152 mm | 3,030 psi | 3,669 psi | 4,268 psi | 5,364 psi |
| 8 in. | 203 mm | 2,405 psi | 2,931 psi | 3,431 psi | 4,361 psi |
| 10 in. | 254 mm | 1,994 psi | 2,441 psi | 2,869 psi | 3,675 psi |
| 12 in. | 305 mm | 1,703 psi | 2,091 psi | 2,465 psi | 3,175 psi |
| 14 in. | 355 mm | 1,486 psi | 1,829 psi | 2,160 psi | 2,749 psi |
| 16 in. | 406 mm | 1,318 psi | 1,625 psi | 1,923 psi | 2,496 psi |
| 18 in. | 457 mm | 1,184 psi | 1,462 psi | 1,733 psi | 2,254 psi |
| 20 in. | 508 mm | 1,075 psi | 1,329 psi | 1,577 psi | 2,056 psi |
| 24 in. | 609 mm | 908 psi | 1,124 psi | 1,336 psi | 1,748 psi |
| 30 in. | 761 mm | 736 psi | 913 psi | 1,087 psi | 1,427 psi |
| 36 in. | 914 mm | 619 psi | 769 psi | 916 psi | 1,206 psi |
| 42 in. | 1066 mm | 534 psi | 664 psi | 792 psi | 1,044 psi |
| 48 in. | 1218 mm | 469 psi | 584 psi | 697 psi | 920 psi |
| 52 in. | 1320 mm | 435 psi | 541 psi | 646 psi | 853 psi |
| 60 in. | 1523 mm | 378 psi | 471 psi | 563 psi | 744 psi |
| 66 in. | 1675 mm | 345 psi | 429 psi | 513 psi | 679 psi |
| 72 in. | 1827 mm | 317 psi | 394 psi | 472 psi | 625 psi |
| 84 in. | 2132 mm | 272 psi | 339 psi | 406 psi | 538 psi |
| 96 in. | 2436 mm | 239 psi | 298 psi | 356 psi | 473 psi |
| 108 in. | 2741 mm | 213 psi | 265 psi | 318 psi | 422 psi |
| 120 in. | 3046 mm | 192 psi | 239 psi | 286 psi | 380 psi |

FIG. 3

| TOTAL WALL THICKNESS OF DOUBLE-WALL PIPE | THICKNESS OF INDIVIDUAL WALL PLIES | | | |
|---|---|---|---|---|
| | IMPERMEABLE FIRST PLY INNER WALL | PERMEABLE PIPE ANNULUS | | IMPERMEABLE FOURTH PLY OUTER WALL |
| | | SECOND PLY | THIRD PLY | |
| 0.15 in. (3.81 mm) | 0.02 in. (0.51 mm) | 0.06 in. (1.52 mm) | 0.05 in. (1.26 mm) | 0.02 in. (0.51 mm) |
| 0.20 in. (5.08 mm) | 0.01 in. (0.25 mm) | 0.10 in. (2.54 mm) | 0.08 in. (2.03 mm) | 0.01 in. (0.25 mm) |
| 0.30 in. (7.61 mm) | 0.04 in. (1.01 mm) | 0.13 in. (3.29 mm) | 0.10 in. (2.54 mm) | 0.03 in. (0.76 mm) |
| 0.40 in. (10.15 mm) | .05 in. (1.26 mm) | 0.17 in. (4.31 mm) | 0.13 in. (3.3 mm) | 0.05 in. (1.26 mm) |
| 0.50 in. (12.7 mm) | 0.06 in. (1.52 mm) | 0.21 in. (5.33 mm) | 0.17 in. (4.31 mm) | 0.06 in. (1.52 mm) |
| 0.65 in. (16.88 mm) | 0.10 in. (2.54 mm) | 0.26 in. (6.6 mm) | 0.21 in. (5.32 mm) | 0.08 in. (2.03 mm) |
| 0.75 in. (19.03 mm) | 0.10 in. (2.54 mm) | 0.30 in. (7.61 mm) | 0.25 in. (6.35 mm) | 0.10 in. (2.54 mm) |
| 1.00 in. (25.38 mm) | 0.14 in. (3.55 mm) | 0.40 in. (10.15 mm) | 0.33 in. (8.37 mm) | 0.13 in. (3.3 mm) |

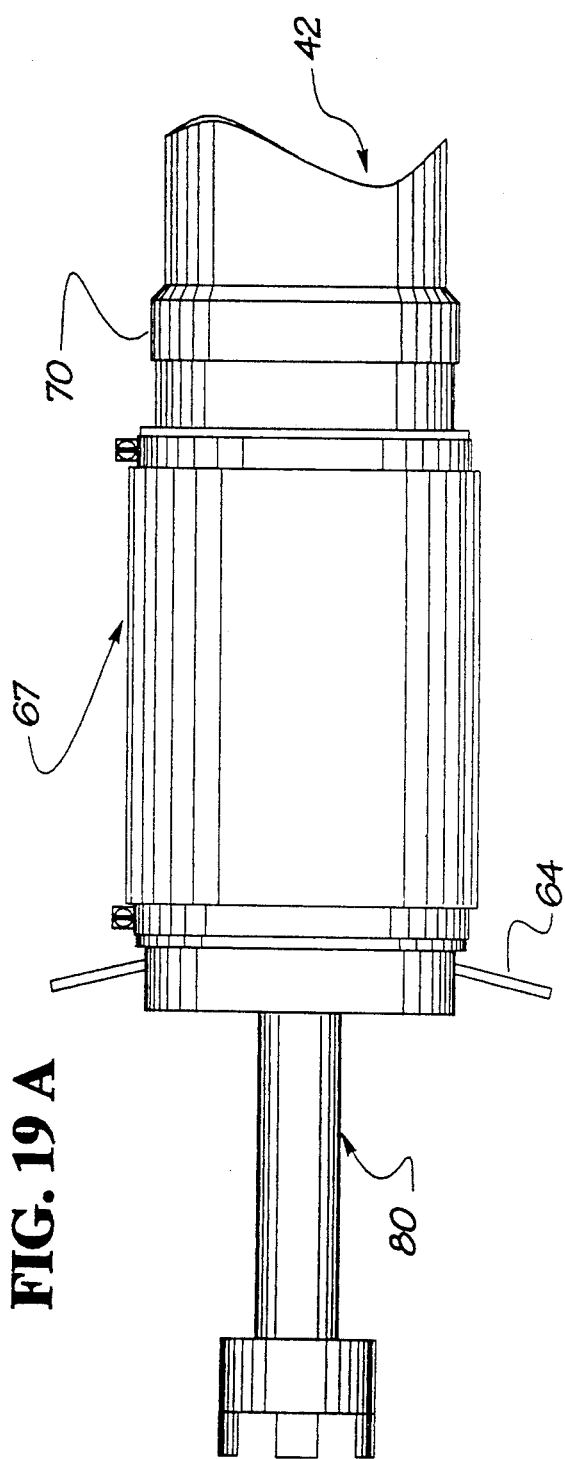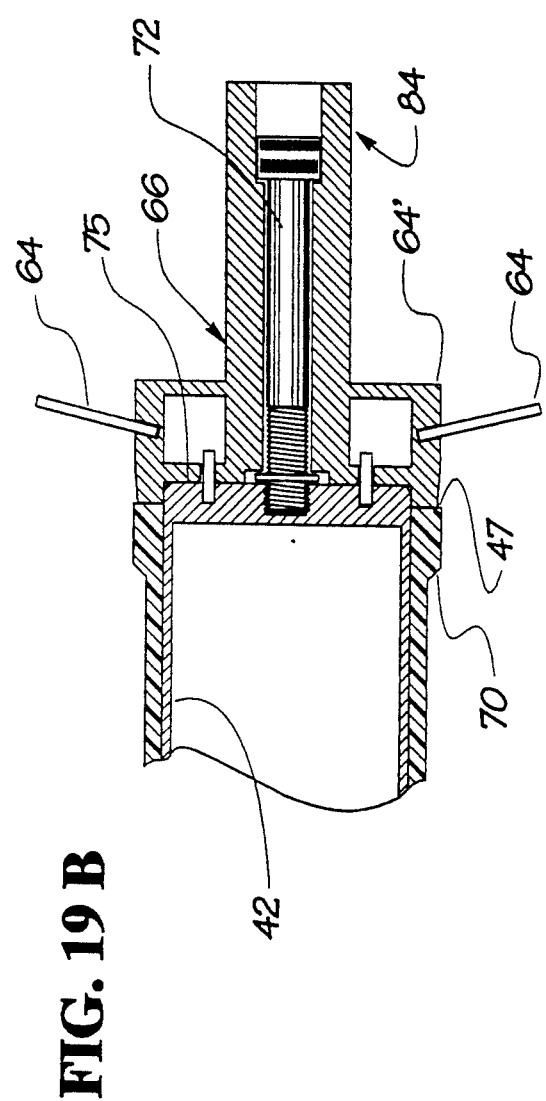
FIG. 19 A
FIG. 19 B

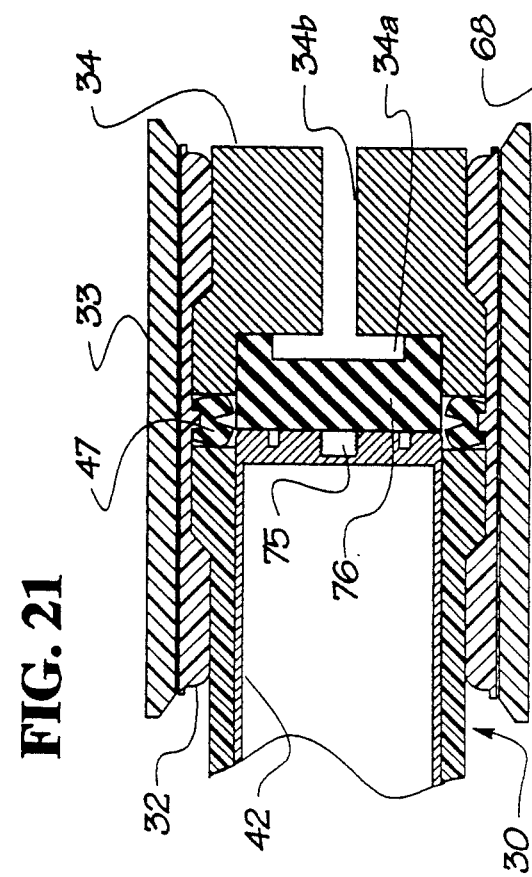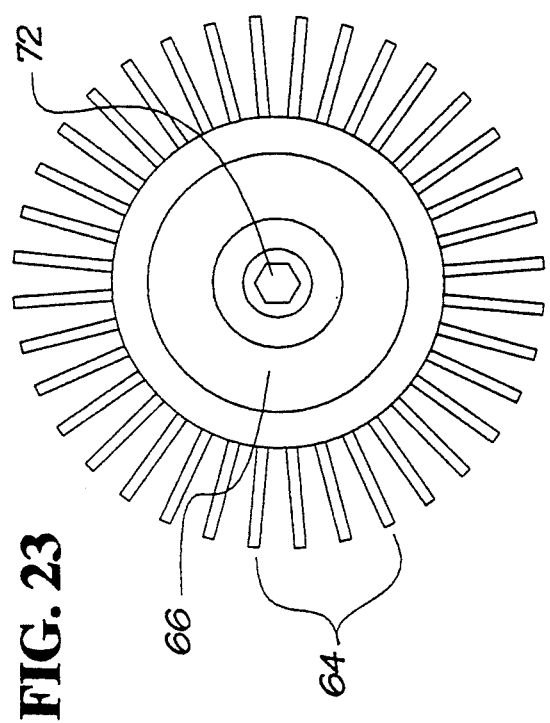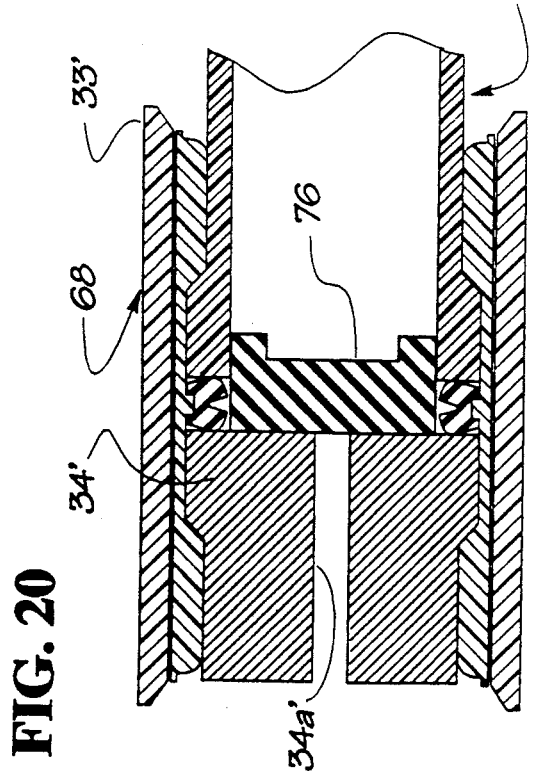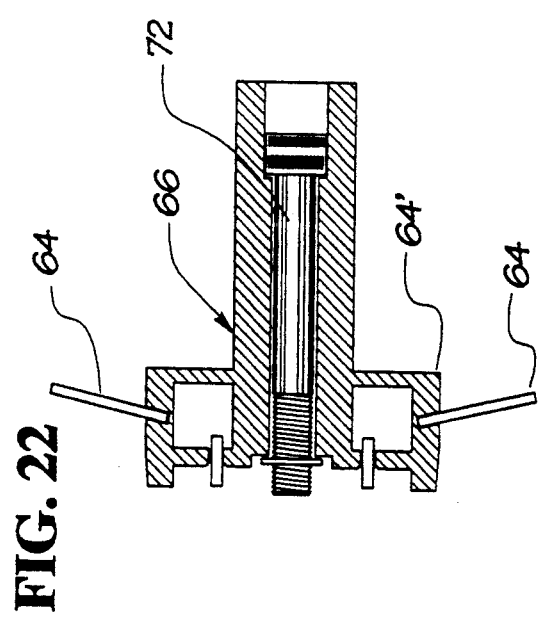

DOUBLE-WALL COMPOSITE PIPE AND COUPLING STRUCTURE ASSEMBLY

TECHNICAL FIELD

This invention generally relates to a composite tubular structure and more particularly to a double-wall composite pipe and coupler assembly providing secondary containment for fluids flowing through the pipe.

BACKGROUND ART

The advent of composite pipes, exhibiting the capability to be mechanically joined expeditiously in sections to provide permanently sealed connections, has supplanted welded steel pipe for many fluid transport applications. In particular, it has been proven that pipe engineers no longer need to depend exclusively upon welded steel pipe as the most reliable and economical system for transporting various fluids, such as water, oil, gas and slurry products. In addition to features, such as high strength-to-weight ratio and long term resistance to cyclic fatigue and corrosion, composite pipes exhibit an extremely smooth inner surface that functions to reduce fluid flow friction to thus lower pumping costs.

The most important aspect for drawing economic comparisons between steel and composite pipes of equivalent linear footage, constitutes the method and resulting labor costs required to join and seal pairs of longitudinally connected pipe sections together. Steel pipe sections are most economically joined and sealed by welding, rather than by the use of sealed bolted flanges or threaded couplings. Conversely, composite pipe sections are most economically joined and sealed together by the use of mechanical couplings, rather than by the use of in-the-field bonded connections. The speed and ease by which composite pipe sections can be coupled together and sealed, as well as uncoupled for repair or replacement purposes, greatly enhances the economic worthwhile of composite pipes for many fluid transport systems.

Various federal, state and local governmental agencies, such as the United States Environmental Protection Agency (EPA), now require that pipelines conveying hazardous liquids or gases provide secondary containment capabilities in the event of leakage. One conventional approach to solving the secondary containment problem is to install pipelines in a trench, having an impermeable liner. Leak-proof trenches of this type are expensive to install, difficult to maintain and cannot be used when a pipeline traverses rivers or lakes or are installed along the floor of an ocean.

Another conventional method for solving the secondary containment problem is to utilize a double-wall pipe, comprising impermeable inner and outer walls separated radially by an annular void or permeable annulus structure. Leakage is continuously monitored by placing leak detecting sensors at strategic locations within selected pip sections. Double-wall pipes of this type are designed to resist normal longitudinal and circumferential stresses imposed on the pipe by fluctuating fluid pressures and flow velocities However, such pipes are incapable of efficiently resisting other types of extreme pressures and bending and compression loads imposed on the pipes when they are put into commercial use.

Since the outer wall of a standard double-wall pipe has a diameter larger than that of the inner wall, the outer wall will experience hoop stresses of higher magnitude than the inner pipe for a given working pressure. Therefore, it is common in the industry to construct the outer wall to be at least as thick as the inner wall, which serves as the primary fluid transport container. In some pipe applications, the inner and outer walls are separated by structural members, such as corrugated sheets, longitudinal or circumferential ribs or spokes, clips or permeable rigid foam materials, in an attempt to increase the overall structural integrity of the pipe.

For example, conventional double-wall composite pipes of this type are disclosed in U.S. Pat. Nos. 3,784,441 and 4,758,024. In particular, the double-wall composite pipes disclosed in these patents comprise impermeable inner and outer walls separated by ribs. The composite load-resisting material comprising the inner and outer walls of the pipes usually comprises an impermeable fiber-reinforced thermosetting resin.

The annulus region of a conventional double-wall composite pipe, disposed radially between the inner and outer walls of the pipe, is primarily designed to provide for the secondary containment of fluids This region, although housing structural members of the type described above for certain commercial pipe applications, is generally non-structural in physical make-up. In particular, the region between the pipe's walls is normally sealed and evacuated, filled with a liquid to disclose a leak in either pipe wall or remains air-filled and houses leak-detecting sensors or probes. Such an annulus region, fabricated separately apart from the fabrication of the inner and outer walls of the pipe, is usually unduly complicated in physical make-up and expensive to fabricate, install and service.

The joined sections of conventional double-wall composite pipes are normally secured together at joint connections by an adhesive or by bolted flange connections. Fabrication of these types of joint connections is oftentimes found to be unduly labor intensive, difficult to achieve expeditiously and efficiently, and cost prohibitive. The cost factor is compounded due to the complex and expensive production equipment required to individually fabricate components of such conventional joint connections.

Further, standard double-wall composite pipes do not possess hydrostatic design basis strengths greater than 12,000 psi, as dictated by ASTM D2992, primarily since the strength at their joint connections does not exceed the interlaminar shear or tensile strength of the composite matrix material composing the pipes Conventional pipes of this type also possess relatively high longitudinal strain values and, consequently, will tend to elongate excessively, when placed into use. Elongation of the pipes will produce buckling stresses that must be resisted by either burying the pipes underground or by utilizing specially designed pipe anchoring devices. Expansion loops or special compensating devices are also used to compensate for pipe expansion due to changes in pipe material temperature and/or longitudinal stress.

Coupling structures, used at the joint connections for the pipes to connect and seal the inner walls together, do not also connect and seal the outer walls of adjacent pipe sections together. Thus, the structural integrity of the integrated pipes is less than desired. Further, no permeable stress-resisting structure is provided between the impermeable inner and outer walls. Also, the pressure and flow rate of fluid leaking from a fractured inner wall is generally not inhibited within the pipe.

DISCLOSURE OF INVENTION

This invention overcomes the above, briefly described problems of the prior art by providing a tubular structure exhibiting a high degree of structural integrity, inherent secondary containment capabilities and ability to be fabricated and installed expeditiously and economically.

In its broadest aspect, the tubular structure comprises a plurality of plies composed of filaments and hardenable adhesive means impregnating the filaments to form hardened matrixes for the plies. Means in at least one of the plies preconditions the structure to reduce the flow rate and pressure of fluid leaking from a ruptured wall to thus inhibit fluid leakage In addition, such means resists and absorbs, without rupture of an internal impermeable ply, internal operating pressures and high strain-rate stresses resulting from impact and hydrostatic shock loads imposed thereon.

The preferred tubular structure embodiment of this invention comprises an impermeable first ply, a permeable second ply surrounding the first ply, a permeable third ply surrounding the second ply, and an impermeable fourth ply surrounding the third ply. The first and fourth plies are preferably composed of filament-reinforced thermosetting polymeric resins. The second ply is preferably composed of circumferentially oriented continuous filament reinforcements whereas the third ply is preferably composed of longitudinally oriented continuous filament reinforcements. The filament reinforcements of each of the second and third plies are each preferably embedded in a frangible matrix containing a multitude of microfractures whereby the second and third plies form a permeable annulus structure.

In another aspect of this invention, a method and apparatus for making the above-described tubular structure are taught.

BRIEF DESCRIPTION OF DRAWINGS

Other objects and advantages of this invention will become apparent from the following description and accompanying drawings wherein:

FIG. 1 is a table listing the recommended maximum test pressures for a range of coupled double-wall pipe sizes having total wall thicknesses ranging from 0.15 inch to 0.4 inch (3.8 mm to 10.2 mm).

FIG. 2 is a table listing the recommended maximum test pressures for a range of coupled double-wall pipe sizes having total wall thicknesses ranging from 0.5 inch to 1.0 inch (12.7 mm to 25.4 mm).

FIG. 3 is a table listing the thicknesses recommended for each of the four plies comprising the composite double-wall pipe of this invention and belonging to the test pressure categories illustrated in FIGS. 1 and 2.

FIG. 19A is a side elevational view of a cured pipe with the pipe joint flange forming tools having been removed and with the coupler mold being shown in a closed and clamped position about the joint.

FIG. 19B is a sectional side elevational view showing an end of the pipe mounted on the mandrel, having a removable anchoring pin and axle assembly attached thereto.

FIG. 20 is a sectional view showing the final position of a reciprocal follower plug and a stationary end plug after the pipe has been removed from the mandrel.

FIG. 21 is a similar view, but shows the initial position of the follower plug and a second end plug.

FIG. 22 is a longitudinal cross sectional view of the anchoring pin axle assembly after it has been removed from the mandrel.

FIG. 23 is an end elevational view of the anchoring pin and axle assembly.

PREFERRED ARTICLE EMBODIMENT

Figure 4:
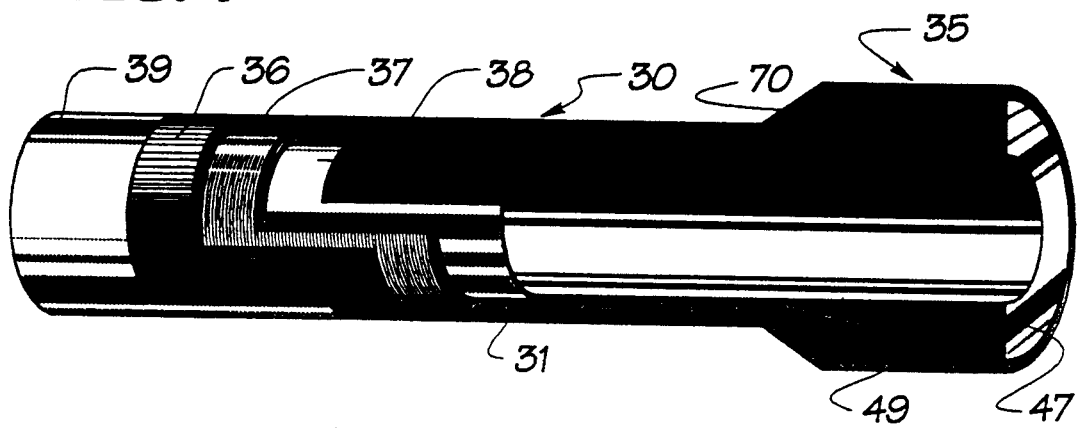
FIG. 4 is a partially sectioned isometric view of a flanged joint end of the pipe.

The preferred article embodiment of the present invention comprises a composite double-wall tubular structure, shown as a pipe 30 (FIG. 4), that falls within one of the eight maximum test pressure categories shown in FIGS. 1 and 2 FIG. 1 charts the recommended maximum test pressures for a range of double-wall pipe sizes having a total wall thickness, including the thickness of a permeable two-ply annulus structure 31 encased within an impermeable inner ply or liner 38 and an impermeable outer ply or cover 39 (FIG. 4), ranging from 0.15 inch (3.8 mm) to 0.4 inch (10 mm). FIG. 2 charts the recommended maximum test pressures for a range of pipe sizes having a total wall thickness ranging from 0.5 inch (12.7 mm) to 1.0 inch (25 mm). The maximum test pressure is precalculated to be at least twice the maximum use pressure for pipes intended for a minimum service life of twenty-five years when immersed in water at ambient temperatures below 150° F. FIG. 3 charts the thicknesses recommended for each of four plies comprising the preferred pipe embodiment of the present invention that belong to each of the pipe pressure categories shown in FIGS. 1 and 2.

Figure 13:
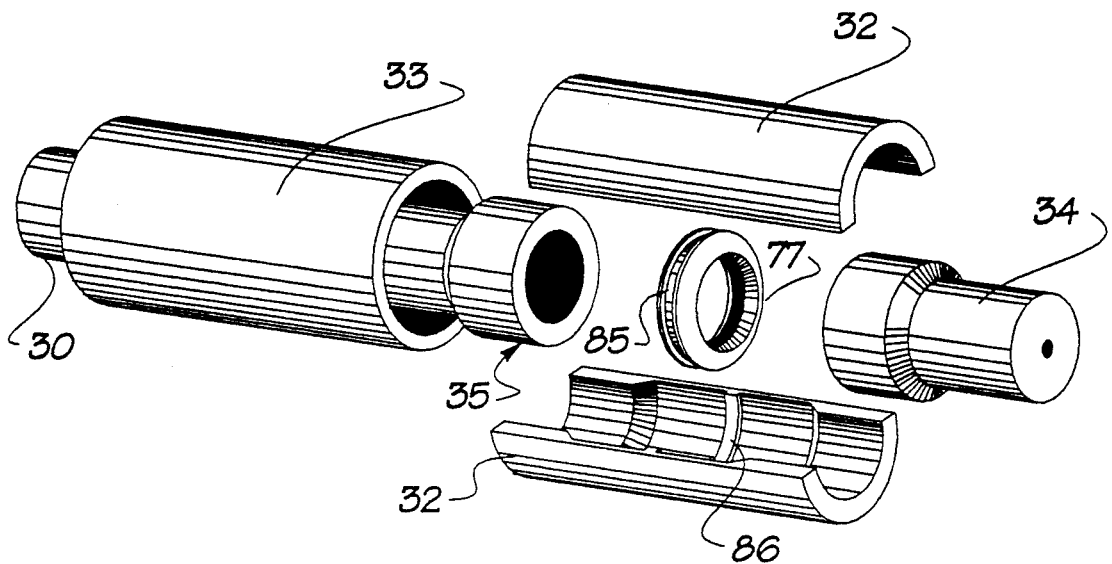
FIG. 13 is an exploded isometric view of the coupling assembly and an end plug.
Figure 14:
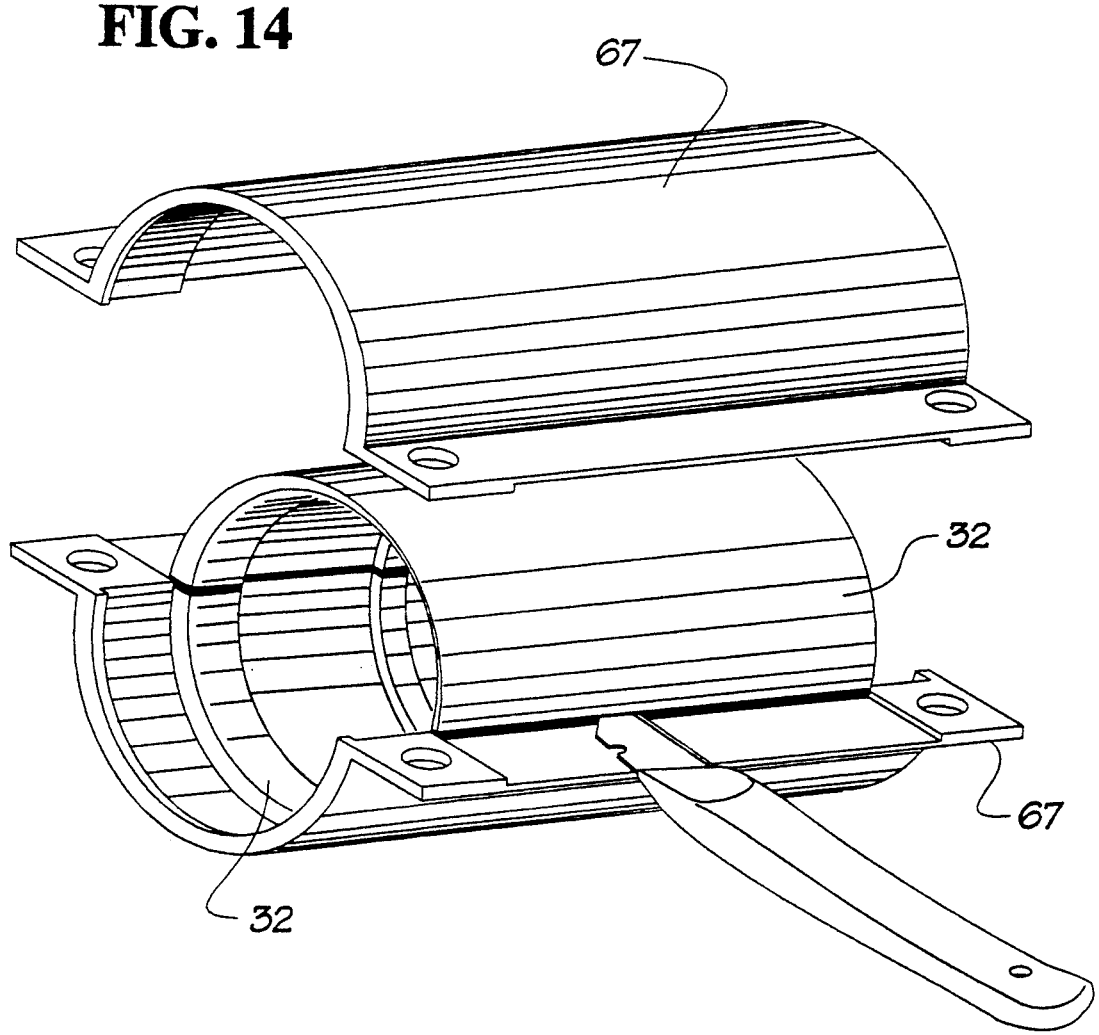
FIG. 14 is an exploded view illustrating a two-piece coupler mold for a pair of half couplers and a knife used for separating the couplers.

The test pressures shown in FIGS. 1 and 2 are based upon the combined longitudinal tensile strength of two assembled and semi-cylindrical half couplers 32, adapted to be retained within a cylindrical coupler sleeve 33 (FIG. 13). The assembly of the two half couplers within coupler sleeve 33 resists the maximum end load that is imposed on flanges 70 of the internally pressurized pipe. This working pressure is calculated by the formula: $P=L/A$, where "P" is the maximum test pressure (psi) the pipe is designed to resist (equalling twice the maximum operating pressure, MOP), "L" is the maximum end load (lb.) to which the pipe is subjected when the pipe is internally pressurized while sealed by end plugs 34 and 34' (FIGS. 7, 20 and 21) and "A" is the cross-sectional area (inches squared) of a pipe flanged joint end 35 (FIG. 4). Area "A" is calculated by the formula: $A=(D+1.5+2(T-0.4))^{\wedge}2 * 0.7854$, where "D" is the pipe's inner diameter and "T" is the pipe's total wall thickness (four plies), when the pipe's wall thickness is 0.4 inches or more. If the pipe's total wall thickness is 0.4 inches or less, the joint end area will equal $0.7854*(D+1.5)^{\wedge}2$.

Figure 11:
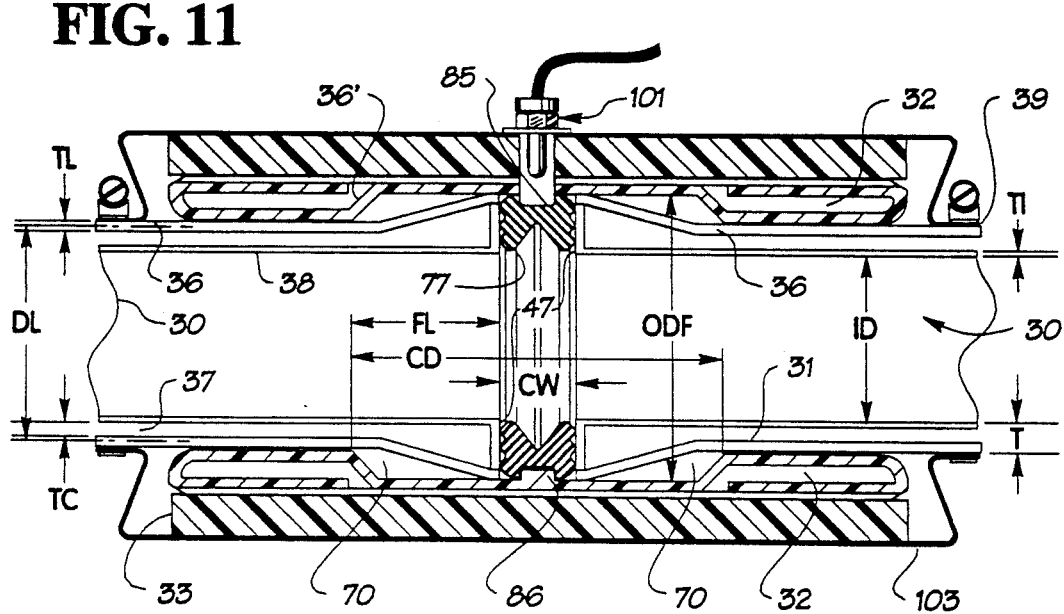
FIG. 11 is a cross-sectional view schematically showing two pipes connected and sealed together by the coupling assembly, but with the various plies only being outlined and schematically shown for illustration purposes.

The wall thicknesses recommended in FIG. 3 are based on the following assumptions:
1. The total wall thickness (T) of the pipe is one of the eight thicknesses shown in FIG. 3.
2. The thickness (TL) of the pipe's permeable third ply 36 (FIG. 4), comprising undirected longitudinally oriented strands, is equal to one-third of the total wall thickness of pipe 30.
3. The maximum allowable design strength, (SC) for the pipe's permeable second ply 37, comprising circumferentially oriented glass filament strands, is 50,000 psi (345 MPa), i.e., SC=50,000 psi.
4. The maximum allowable design strength (SL) for ply 36 is 35,000 psi (241 Mpa), i.e., SL=35,000 psi, and is governed by the transverse shear strength of the pipe's third ply 36 or a coupler flange inner ply 36', each comprising longitudinally oriented filament strands (FIG. 11).

As an illustrative example, it is assumed that the double-wall composite pipe of the present invention has an inner diameter (D) equalling 6.0 inches and a total pipe wall thickness (T) equalling 0.4 inches. The pipe's joint-end area (A) equals 0.7854 times $(6+1.5)^{\wedge}2$, or 44.18 square inches and the thickness of the pipe's third ply 36 (TL) is equal to T/3 or 0.13 inches. Using a third ply maximum allowable design strength (SL) of 35,000 psi and a third ply thickness equal to 0.13 inches, then the maximum allowable tensile end load per circumferential inch (EL) equals 35,000×0.13 or 4,550 lb. The total tensile end load, (L) that can be resisted by third ply 36 and the pipe couplers equals 4,550×3.1416×7.5=107,207 lb. The maximum pressure (P) to which the pipe should be tested, is the total tensile end load (L) divided by the joint-end area (A) and equals 107,207/44.18=2,426 psi (16.7 Mpa).

Using this pressure value, (which is based on the pipe's maximum coupling strength, i.e., "end load" capability), the minimum thickness (TC) of the pipe's second ply 37 can be calculated from the formula:

$$TC=(P*D)/(2*SC)=(2,426*6)/100,000= 0.145 \text{ inches (3.68 mm)}$$

The hoop stress applied to the circumferential reinforcements comprising ply 37 should preferably not exceed 62,000 psi (428 Mpa), which is the HDBS (Hydrostatic Design Basis Strength) of the glass filament reinforced thermosetting resin material preferably comprising second ply 37.

The formula for determining the hoop stress (HS) is: $HS=P*D/2*TC$, where "P" is the internal pipe pressure (psi), "D" is the pipe's inner diameter (inches), and "TC" is the wall thickness of ply 37. For example, and referring to FIGS. 1 and 2, the maximum test pressure recommended for a 20 inch diameter double-wall pipe is 2,056 psi when the total wall thickness is 1.0 inch. The maximum hoop stress imposed upon the 0.4 inch thick ply 37 is determined from the following calculation:

$$HS=2,056 \; psi*20 \; in./2*0.4 \; in. = 51,400 \; psi$$

$$(HS=14.18 \; Mpa*507.6 \; mm/20.3 \; mm=354.57 \; Mpa)$$

Preferred Materials For Pipe 30

The preferred materials composing impermeable inner wall liner or first ply 38 and impermeable outer wall cover or fourth ply 39 comprises a fabric-reinforced thermoplastic resin having a maximum elongation at tensile failure of at least 5%. For discussion and clarity purposes, plies 38, 37, 36 and 39 are referred to as the first, second, third and fourth plies, respectively, i.e., as sequentially fabricated in a radially outward direction. Such resins include vinyl esters, such as Corezyn 8520 manufactured by Interplastics Corp., an elastomeric epoxy resin, polyurethane elastomers, or other suitable bonding resins well-known to those skilled in the composite pipe art.

Figure 24:
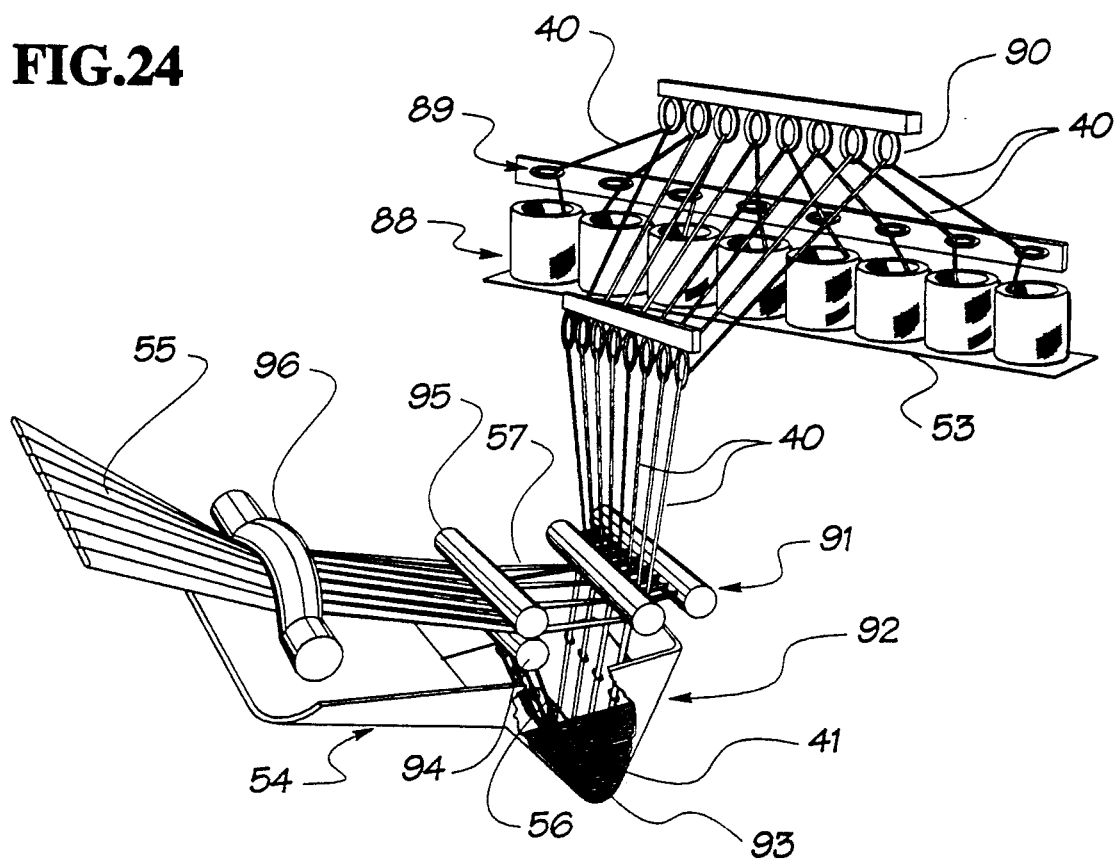
FIG. 24 schematically illustrates an apparatus for making a warp ribbon for the second ply of the pipe from alternating wet and dry continuous filament strands.
Figure 25:
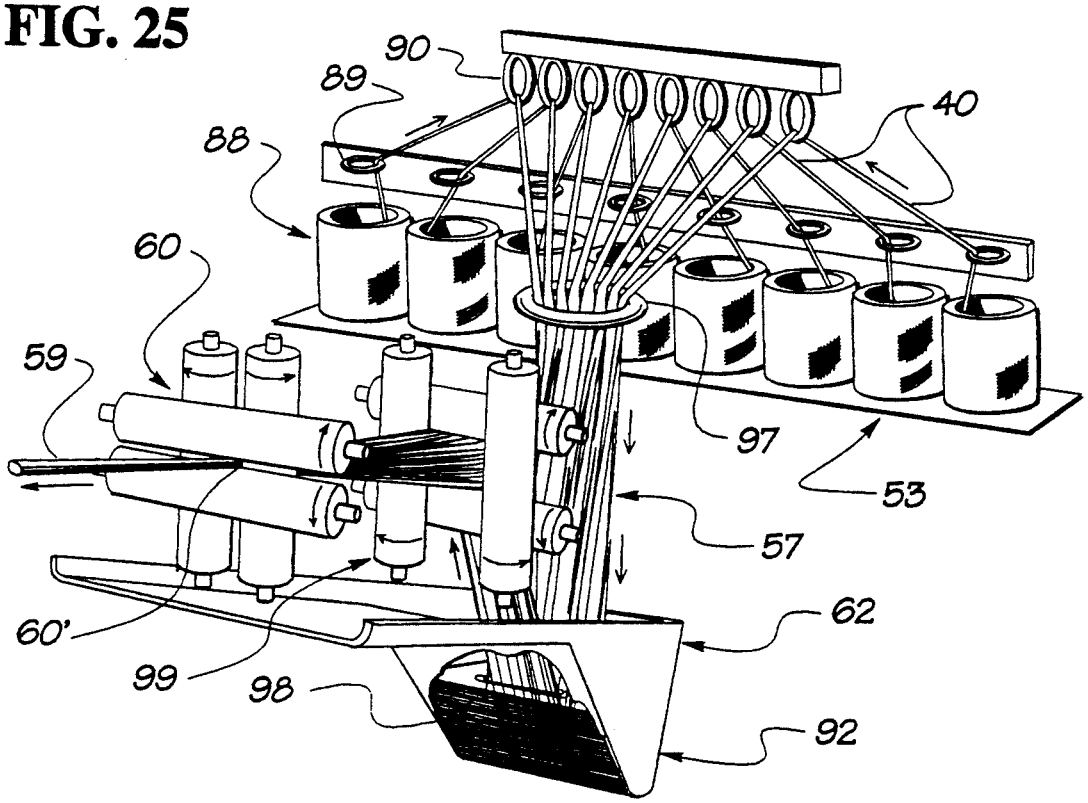
FIG. 25 schematically illustrates an apparatus for making a strand cord for the third ply of the pipe.

The preferred materials composing each ply 36 and 37, comprising two ply permeable annulus structure 31, are continuous strands of glass filament reinforcements 40 and a low elongation frangible polymeric matrix 41 (FIGS. 24 and 25). A suitable glass filament reinforcement is the commercially available E glass roving called Flexstrand, manufactured by Fiber Glass Industries of Amsterdam, New York, having a yield of 225 yards per pound and produced under product code 220-CO-700. Suitable composite matrix materials are a hardenable soluble silicate having a viscosity approximating 100 centipoise, and the commercially available isophthalic polyester resin called Aropol 7240W, manufactured by Ashland Chemical Co., Columbus, Ohio. Other suitable filament reinforcements and resins for making the frangible matrices can be utilized, as will be appreciated by those skilled in the composite pipe art.

Apparatus and General Method for Making Pipe 30

The following description relates to the preferred apparatus and method for making the double wall pipe and coupling structures of this invention (FIGS. 7–26).

Figure 26:
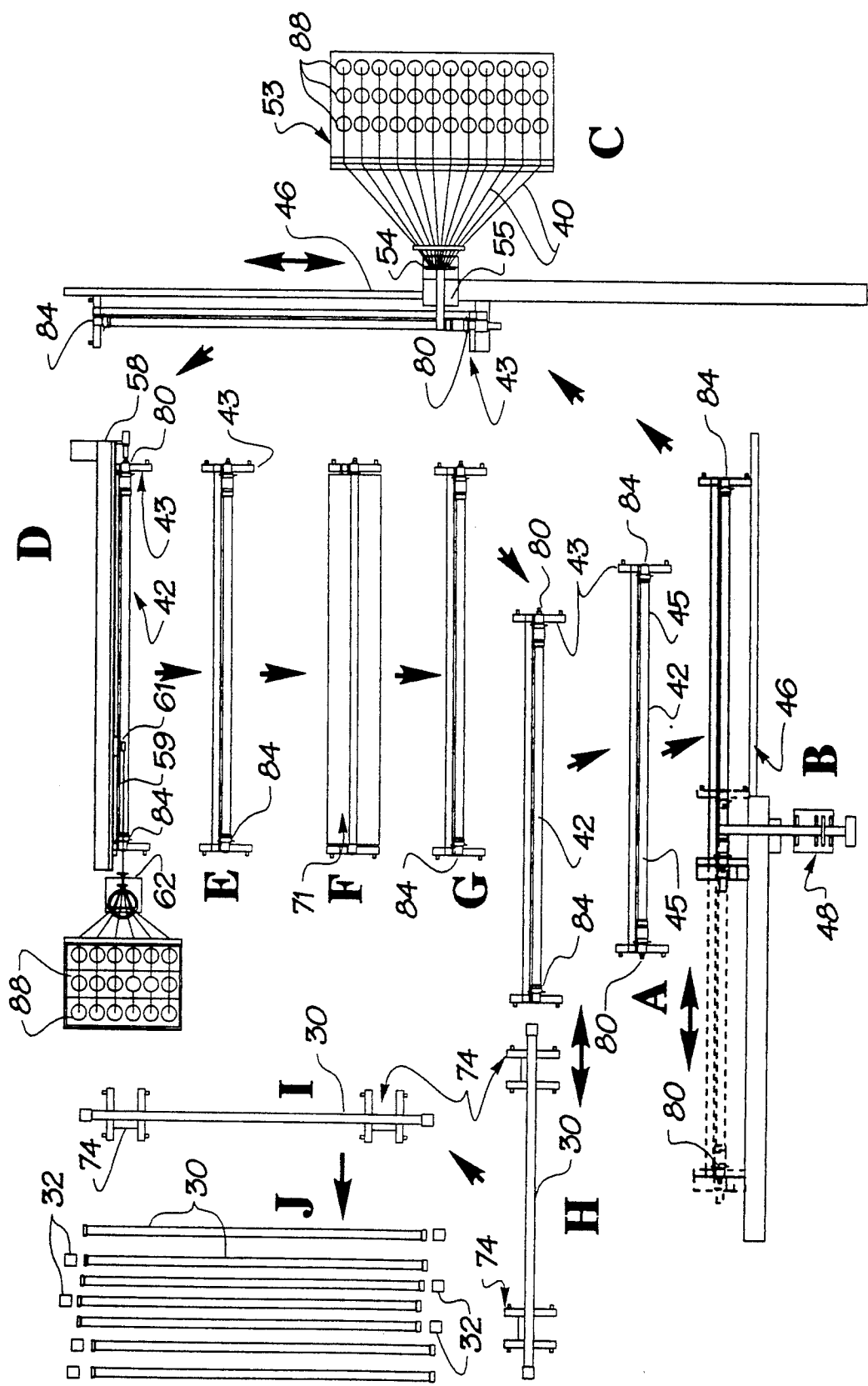
FIG. 26 schematically illustrates the sequence of work stations utilized to fabricate the pipe and coupling assembly of this invention.

FIG. 26 is a schematic plan view illustrating the apparatus and sequence of work stations "A"–"J" through which a dolly-supported mandrel 42 is transported during the entire fabrication of pipe 30 and half couplers 32 (FIG. 13). The mandrel is supported on a dolly 43 (FIG. 18) adapted to accommodate pipe mandrels having diameters ranging from two to at least sixty inches.

As illustrated in FIG. 26, dolly-mounted mandrel 42 is first moved to a Mandrel Preparation Work Station "A" where a cylindrical mandrel surface 44 and two semi-cylindrical half-coupler mold surfaces 45 at the ends of surface 44 are cleaned, inspected and coated with a suitable polymeric-resin release agent. Mandrel 42 is next moved to a First Ply Liner Work Station "B" where it is attached to a traversing mandrel power drive apparatus 46, used to make first ply 38. The apparatus comprises a conventional two-component mixing and metering system (not shown) that dispenses a premixed, fast-cure and semi-flexible polymer that is applied to half-coupler mold surfaces 45, cylindrical mandrel surface 44 and an annular surface adapted to form a pipe seal face 47 (FIG. 4) at each end of the pipe as the rotating mandrel moves past an applicator 48. As described more fully hereinafter, a terminus portion of first ply 38 extends radially outwardly to form seal face 47 with the seal face preferably having an outer diameter at least approximately equal to an inner diameter of third ply 36.

Figure 10:
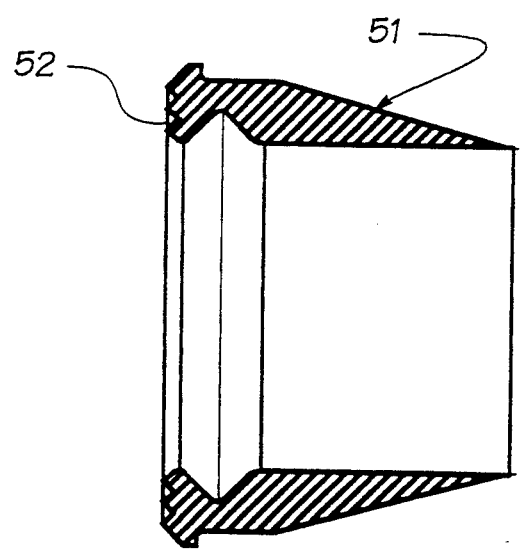
FIG. 10 is a longitudinal cross-sectional view of a combined pipe joint ramp structure and alternate seal ring.

After the pipe seal face material is applied, half-coupler surfaces 45 and cylindrical mandrel surface 44 are wrapped with a conformable dry woven fabric tape so that the bottom surface of the tape become partially impregnated with the semi-cured polymer while the exterior tape surface remains essentially dry. Standard flange ramp-forming tools (FIG. 16), used to make each pipe end conical ramp structure 49 (FIG. 4), are positioned on pipe flanged joint ends 35 near pipe seal face rings 50 (FIG. 16) and centered so that the pipe ramp structure can be filament wound, along with a fast-setting matrix at each pipe end to have a ramp angle of approximately 15°. Alternatively, FIG. 10 illustrates a prefabricated ramp structure 51 (e.g., for the left-hand end of pipe 30 in FIG. 4) that can be placed on the bare mandrel and may include an integral compressible elastomeric ramp seal 52 (replacing hereinafter described seal 77). The liner would then be placed to overlap ramp structure 51, which is preferably made of a hard rubber or other suitable elastomer having a hardness of at least 90 on the shore D hardness scale.

Referring again to FIG. 26, after completion of first ply 38 and conical pipe ramp structure 49, dolly-mounted mandrel 42 is moved to a Second Ply Work Station "C". The mandrel is attached to a second traversing mandrel power drive 46 that moves the mandrel past a fixed creel 53 and a filament winding coater 54. FIG. 24 illustrates the apparatus for making a drip-free filament winding warp ribbon 55, composing second ply 37, from alternating wet and dry continuous filament strands 56 and 57, respectively. Ribbon 55 is filament wound onto the mandrel, while the mandrel moves past filament winding matrix coater apparatus 54, until the desired thickness of second ply 37 is achieved.

As further shown in FIG. 26 and following the placement of materials composing second ply 37, dolly-mounted pipe mandrel 42 is moved to a Third Ply Work Station "D" where it is connected to a computer-controlled power drive 58 and where the flange ramp-forming tools are removed. FIGS. 25 and 26 schematically illustrate the method and apparatus for making a strand cord 59 for its placement upon first ply 37 (FIG. 15), while being pulled from a strand cord forming unit 60 by a computer-controlled strand cord puller 61, to initiate formation of third ply 36. FIG. 25 further schematically illustrates a strand-cord matrix coater 62, described hereinafter, used to impregnate a twined collection of continuous dry filament strands 57. Low friction strand cord forming unit 60 feeds strand cord 59 to traversing strand cord puller 61, used to place the longitudinally-oriented strand cord upon second ply 37 and half-coupler mold surfaces 45 (FIG. 15).

Figure 15:
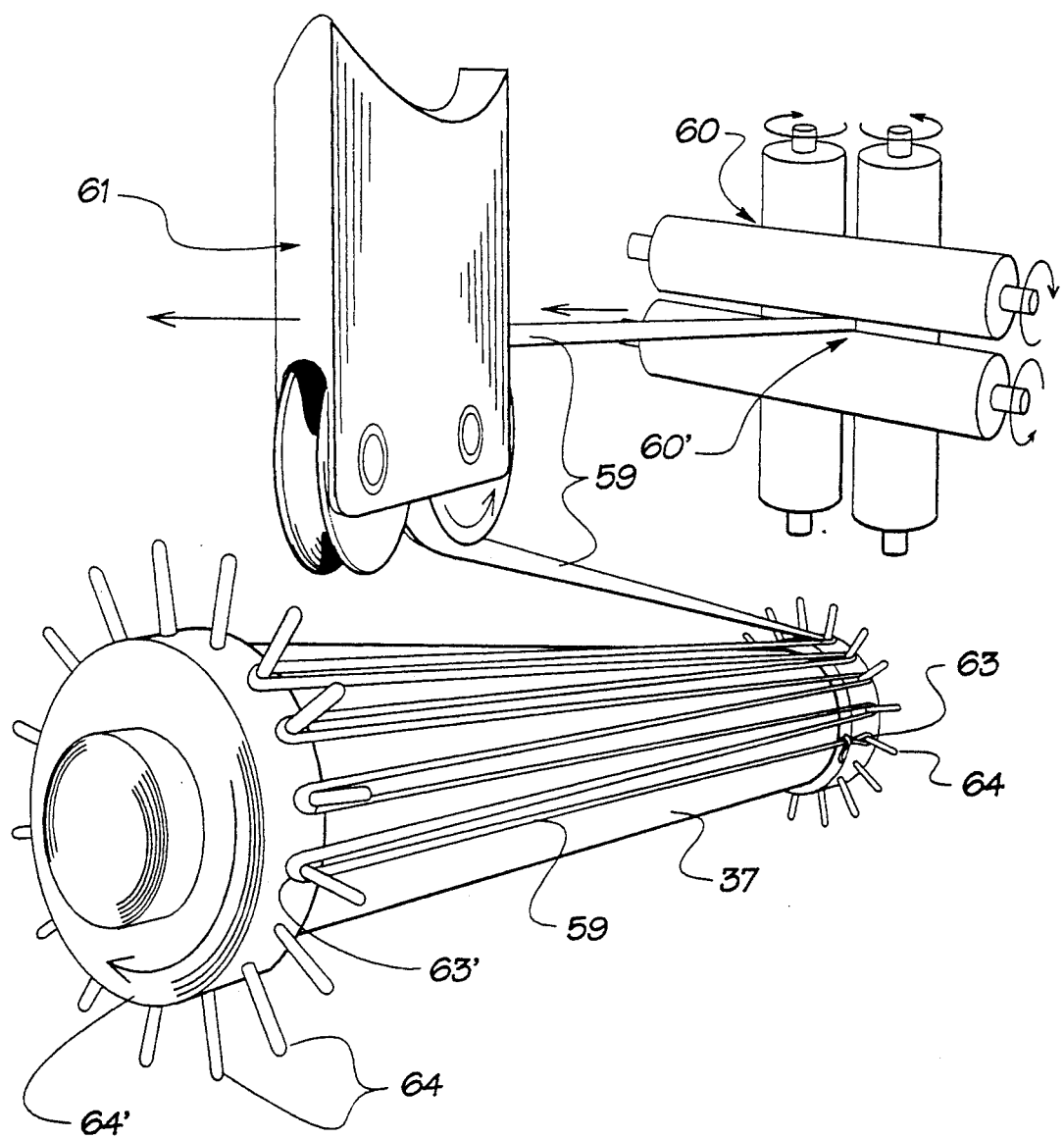
FIG. 15 schematically illustrates apparatus for longitudinally orientating a strand cord for a third ply of the pipe during fabrication thereof on a mandrel.

As further shown in FIG. 15, a leading end 63 of the strand cord is tied to an anchor pin 64 and the strand cord is longitudinally placed over ply 37 and sequentially looped over the anchor pins, at loops 63', to place the back-and-forth sections of the strand cord in a continuous operation over the first ply. The resulting structure is thus formed to provide a series of parallel strand-cord sections threaded around the circular array of oppositely positioned anchor pins 64. Each anchor pin preferably has a diameter of approximately 0.125 inches and the pins are preferably circumferentially spaced approximately 0.65 inches apart (FIG. 23) to permit passage of the strand-cord puller between them during the loop placement and anchoring operation.

More specific descriptions, relating to the fabrication of warp ribbon 55 for second ply 37 (FIG. 24) and strand cords 59 for third ply 36 (FIG. 25) are set forth hereinafter.

Figure 16:
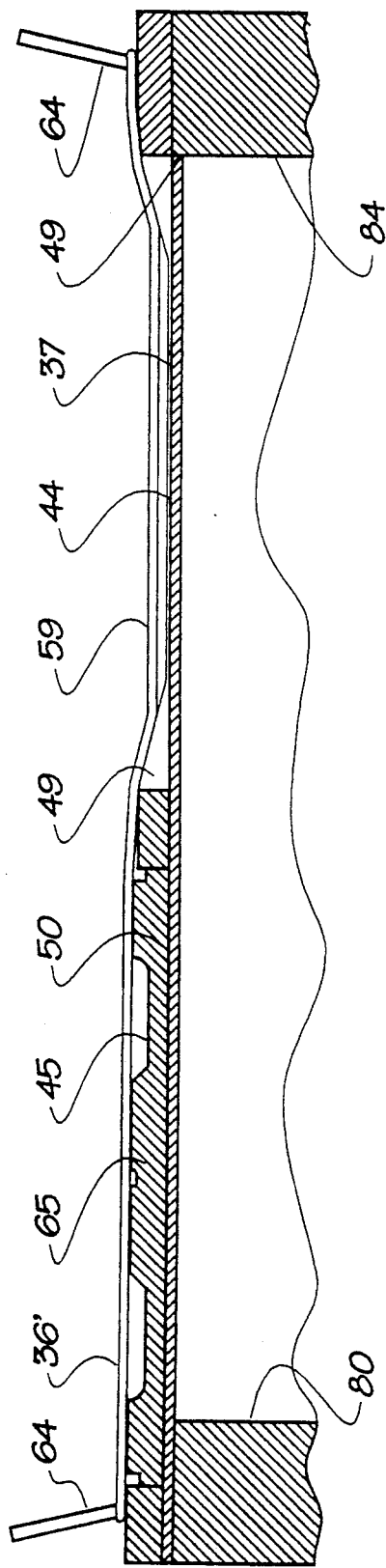
FIG. 16 is a sectional view illustrating the positioning the strand cord upon a ramp structure and a half-coupler flange forming surface.

Again referring to FIG. 26, the dolly-supported mandrel 42 is then moved to a Fourth Ply Work Station "E" where impermeable fourth ply 39, comprising a matrix-impregnated pressure-resistant fabric tape, is wrapped upon third ply 36 and half-coupler forming surfaces 45. While the mandrel rotates, fabric tape is wrapped upon third ply 36 to initiate formation of fourth ply 39, beginning at one pipe end and continuing to the opposite pipe end. Referring to FIG. 16, a removable strand cord holding strap is placed on either side of an inner forming mold 65 for each half coupler 32 to hold the sections of strand-cord 59 in fixed positions. The strand-cord is then cut at the mandrel pin ring located nearest a powered mandrel drive end 80 and at an end of face ring 50 and attached to each end of mandrel 42. The ends of the strand cord are subsequently deflected into half-coupler forming mold 65 by matrix-impregnated strands or reinforcement tape applied manually or automatically in a circumferential direction.

The strand cord holding straps are removed and the loose ends of the longo cord material are then folded back into the mold cavity and retained by windings of strands or tape. A thickened matrix, having the approximate consistency of peanut butter, is applied to the outer surface of the half coupler reinforcement, prior to the placing of a half coupler forming mold 67 (FIG. 14) thereover, to provide sufficient material to assure a uniformly smooth half coupler exterior surface. After the mold is positioned and secured upon the half-coupler material, a razor knife (FIG. 14) is used to cut the cured coupler liner material and the uncured half-coupler material to produce two half-couplers 32 comprising a coupling assembly 68 (FIGS. 11–13), described in detail hereinafter. The coupling assembly is generally of the type disclosed in my U.S. Pat. No. 4,740,422, the disclosure of which is incorporated herein by reference.

Figure 17:
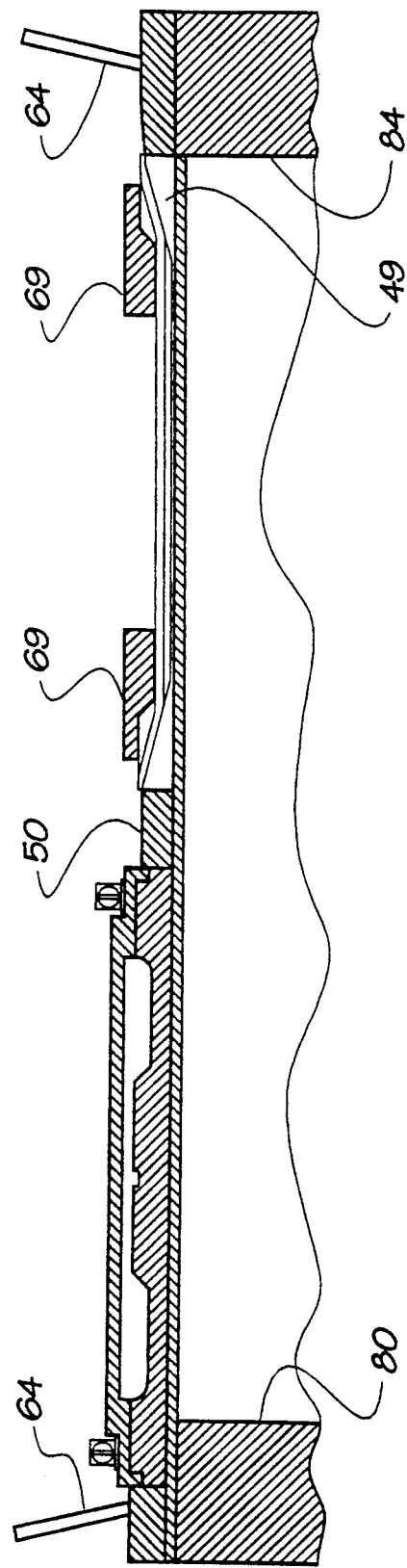
FIG. 17 is a view similar to FIG. 16, but illustrates the location of pipe joint flange forming tools and the coupler mold (FIG. 14) after the strand cords have been cured and trimmed.
Figure 18:
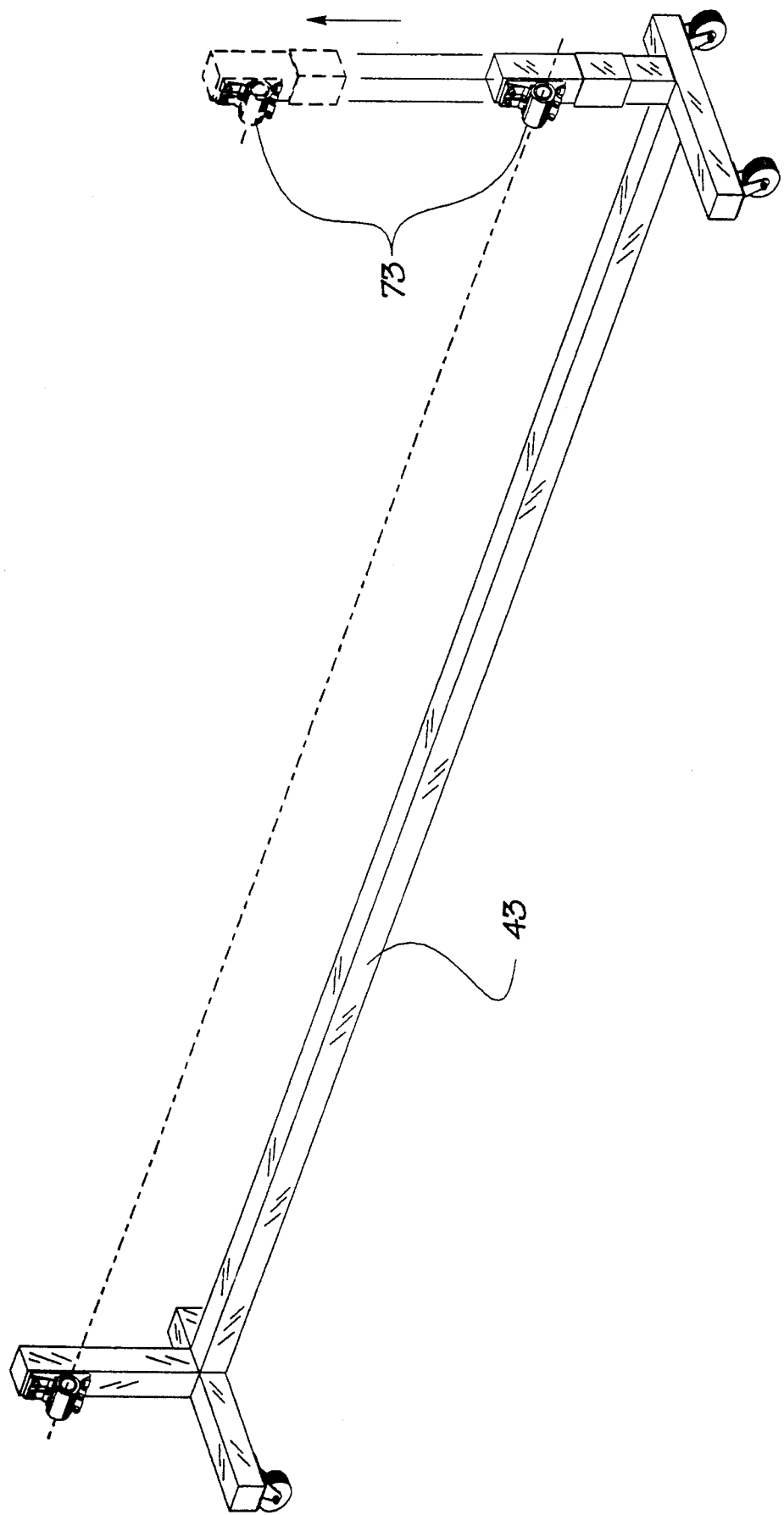
FIG. 18 illustrates a mandrel support dolly, including a removable axle assembly for the mandrel.

As illustrated in FIG. 17 and following the fourth-ply wrapping operation, annular and segmented (removable) pipe joint flange forming tools 69 are positioned upon the fourth ply and a twined strand cord, impregnated in a matrix coater (not shown) is used to wrap circumferentially oriented filament strands between the forming tools and third ply strands 59 to make coupling or pipe flanges 70 (FIG. 4). Referring to FIG. 26 and following placement of the coupler and pipe flange material and their respective flange-forming tools, dolly-mounted mandrel 42 is moved to a Curing Work Station "F" and into a matrix curing unit 71.

The various composite matrix materials are then hardened while the mandrel rotates beneath a bank of radiant heaters. After the pipe and coupler matrix materials are cured and hardened, dolly-mounted mandrel 42 is moved to a Pipe Removal Work Station "G" where flange-forming tools 69 are removed and the strand-cords comprising the pipe's third ply 36 are cut and trimmed so that ply 36 is smooth and flush relative to pipe seal face 47.

FIG. 19A illustrates the flanged end of the cured pipe nearest drive end 80 of mandrel 42 with clamped forming mold 67 in place prior to its being separated and the two half-couplers of the mold removed. FIG. 19B is a sectional view and illustrates attachment of anchor pin and axle assembly 66 to an opposite end of mandrel 42. While the mandrel is supported by a mandrel removal support and locking unit (not shown), a mandrel axle bolt 72 is rotated to remove assembly 66 from mandrel 42.

After detaching assembly 66 from mandrel 42, a mobile electric winch (not shown) is used to lift the assembly and dolly bearings 73, into which it is mounted, free from mandrel 42 to expose pipe seal face 47 and a mandrel lock face 75 (FIG. 21). A first end plug 34 (FIG. 21), containing a rubber follower plug 76, is connected to an end of the pipe by a coupler assembly 68. The coupler assembly comprises a compressible elastomeric seal ring 77, newly formed half couplers 32, and an enclosing coupler retaining sleeve 33. As shown in FIG. 26, when the pipe is ready for removal from the mandrel, it is moved to a Work Station "H" where a suitable pipe removal fluid, such as water, is pumped through a passage 34a formed centrally through end plug 34 (FIG. 21) to pressurize an annular chamber 34b, defined between stationary rubber follower plug 76 and end plug 34 to separate the pipe from the mandrel.

As the removal fluid is pumped into chamber 34b, plug 34 will move rightwardly in FIG. 21 to pull the pipe of the mandrel while follower plug 76 moves leftwardly along the interior surface of the pipe to its FIG. 20 position and until the pipe is free of the mandrel. A passage 34a' is formed through end plug 34' to vent trapped air. As the pipe is removed from the mandrel, it is supported by two movable pipe support dollies 74 (FIG. 26). FIG. 20 shows the final position of follower plug 76. As further shown in FIG. 26, the removed pipe, resting upon pipe support dollies 74, is moved to a Work Station "I" for final fabrication of pipe 30.

This final stage of fabrication involves pressurizing the pipe in the manner described below so that the pipe's annulus structure 31, comprising plies 36 and 37 (FIGS. 5 and 6), is rendered permeable by purposely forming a multitude of longitudinally and circumferentially oriented microfractures 78 and 78' therein, respectively, by use of the apparatus schematically illustrated in FIG. 7. Pipe 30 is first positioned on "frictionless" support rollers 79. By using follower plug 76 (FIG. 20 position), the removed pipe remains filled with the removal fluid retained between the two sealed end plugs 34 and 34' that are mechanically connected to the pipe flanges by coupling assemblies 68. At least two pair of dial indicators 81, calibrated to measure changes in the pipe length, "L", within 0.0010 inch increments, are positioned on opposite sides of the pressurized pipe at each pipe end.

During this final stage of pipe fabrication, the pipe is pressurized by a hydraulic pump system 82 and frequent readings of a pressure gage 83 are taken to maintain the pressurization rate equal to approximately 10 psi (70 pascals) per minute. Changes recorded by the dial indicators provide an accurate measure of the change in length (L) of the pipe being pressurized. Measurements of the change in the pipe length are preferably taken at least every ten minutes and the longitudinal strain (s) is determined from the formula: $s = dL/L$, where "dL" is the change in length measured by the average of the two pair of dial indicators in a ten minute period, and "L" is the length of pipe between the pairs of dial indicators. The strain rate (s/T, in inches per inch per minute) is the ratio of the strain (s) measured at the end of a predetermined time period (T).

Figure 5:
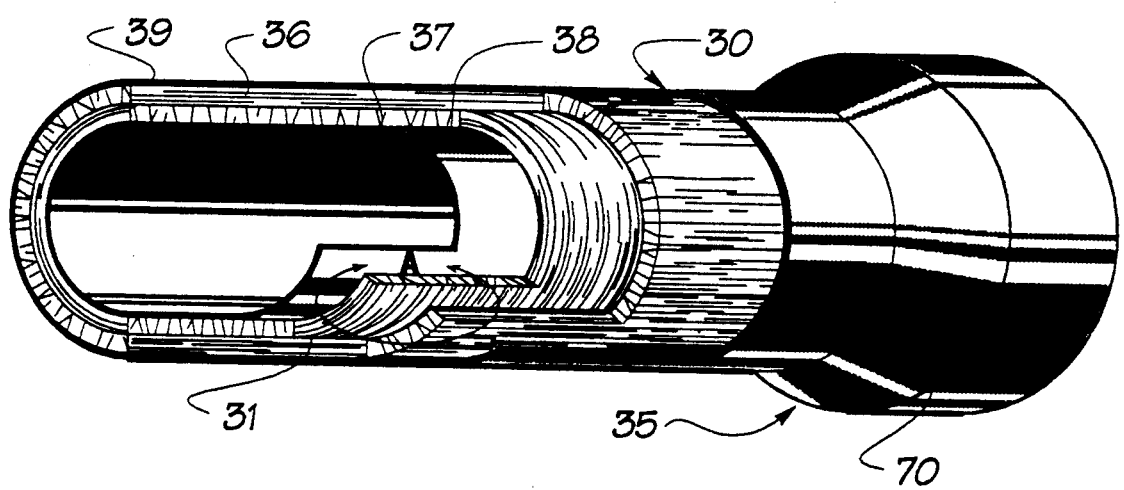
FIG. 5 is a similar, but reversed, partially sectioned isometric view of the pipe, showing microfractures formed in internal plies of the pipe.
Figure 6:
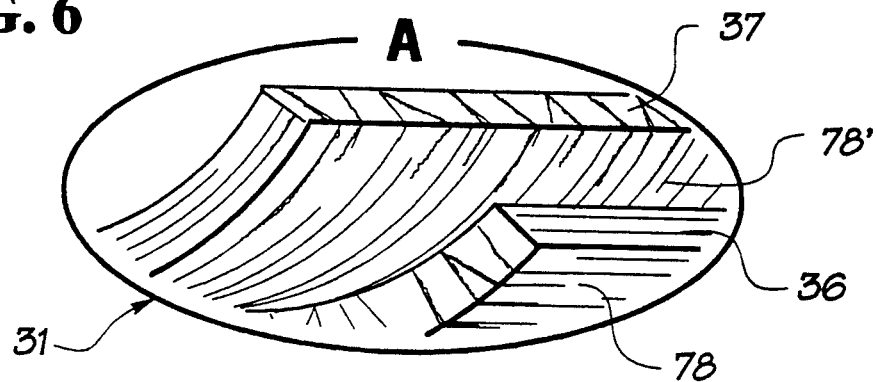
FIG. 6 is an enlarged view of the microfractures, taken within ellipse A in FIG. 5.

Hydraulic pump system 82 is controlled so that the rate of pressurizing the double-wall pipe with water does not permit the maximum average strain rate measured over a thirty minute period to exceed 0.000011 inches per inch (mm/mm) per minute. During the pressurization operation, second ply 37 and third ply 36, comprising pipe annulus structure 31, are stressed beyond the matrix tensile strength of 13,000 psi (90 Mpa) to produce thousands of longitudinally and circumferentially oriented microfractures 78' and 78, respectively, in the frangible matrixes, respectively bonding the circumferential strands of ply 37 and longitudinal strands of ply 36 together. FIG. 6 illustrates a typical section of the pipe's body, showing the microfractures that make the annulus plies permeable. When pressure gage 83 indicates that the pressure has reached a value equal to the maximum intended test pressure (FIGS. 1–3), the fabrication of double-wall composite pipe 30, illustrated in FIG. 4 and FIG. 5, is completed.

The permeable annulus comprising plies 36 and 37 enables the composite pipe to not only attain a very high range of operating pressures (e.g. 10,000 to 20,000 psi or 69 to 140 MPa), but also to resist high strain-rate stresses, such as those accompanying impact and hydrostatic pressure shocks ("water hammer") imposed on the pipe during use. The permeable annulus further functions to inhibit any leakage occasioned by rupture of first ply 38.

Preferred Pipe Coupling Embodiment

Figure 8:
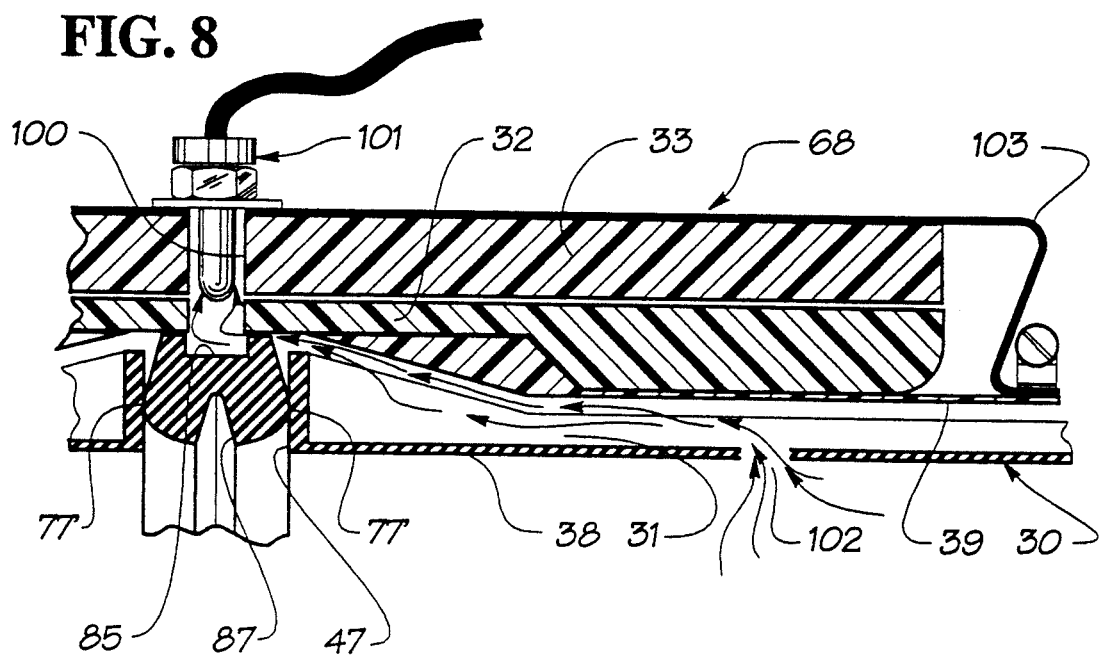
FIG. 8 is an enlarged fragmentary sectional view showing a portion of a coupling assembly connecting and sealing two pipe ends together and further showing the location of a leak detecting sensor.
Figure 9:
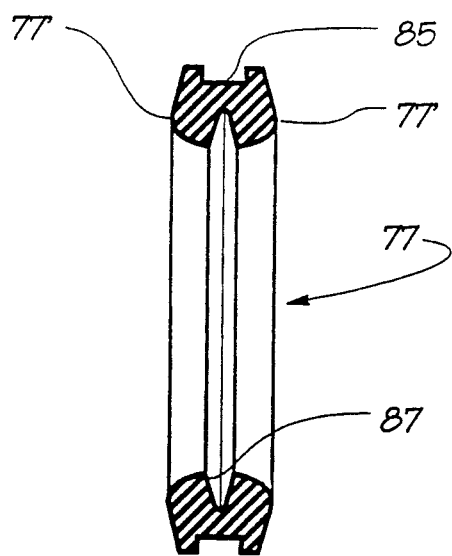
FIG. 9 is a transverse cross sectional view of a pressure-activated seal ring used in the coupling assembly.

FIGS. 8–13 illustrate the connection of adjacent ends of two longitudinally aligned pipes together by a structurally integrated coupler assembly 68. FIG. 9 is a half section of compressible seal ring 77, having a pair of sealing edges 77' that are used to seal each pipe end at seal faces 47. An annular groove 85 is formed on the periphery of the seal ring to mate with an annular retaining flange 86, formed internally on half couplers 32.

Figure 12:
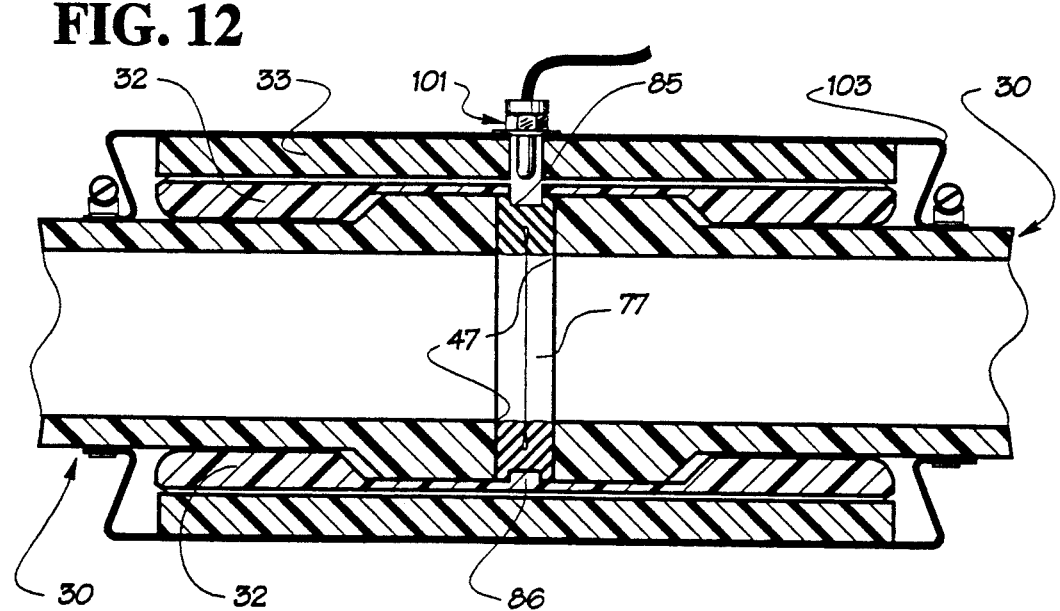
FIG. 12 is a view similar to FIG. 11, but shows the plies in full section and the seal ring (FIG. 9) of the coupler assembly in a compressed, but stable position.

FIGS. 11 and 12 sequentially illustrate that when pipe seal faces 47 are moved towards each other by the engagement of coupling flanges 70 with the ramped flanges of half couplers 32, compressible seal ring 77 will be compressed to approximately 90% of its original width. The outside diameter (OD) of pipe seal faces 47 and pipe flanges 70 (measured in inches) is determined by the following formula: OD=D+1.5 inches+2*(T−0.4 inches), where "D" is the pipe's inside diameter, and "T" is the pipe's total wall thickness. For double wall pipe having a total wall thickness (T) equal to or less than 0.4 inches, the pipe seal face and flange outside diameters are equal to: (D)+1.5 inches. This latter calculation is useful to standardize and simplify coupler and seal ring tooling.

Testing and Performance Desiderata of Pipe 30

Figure 7:
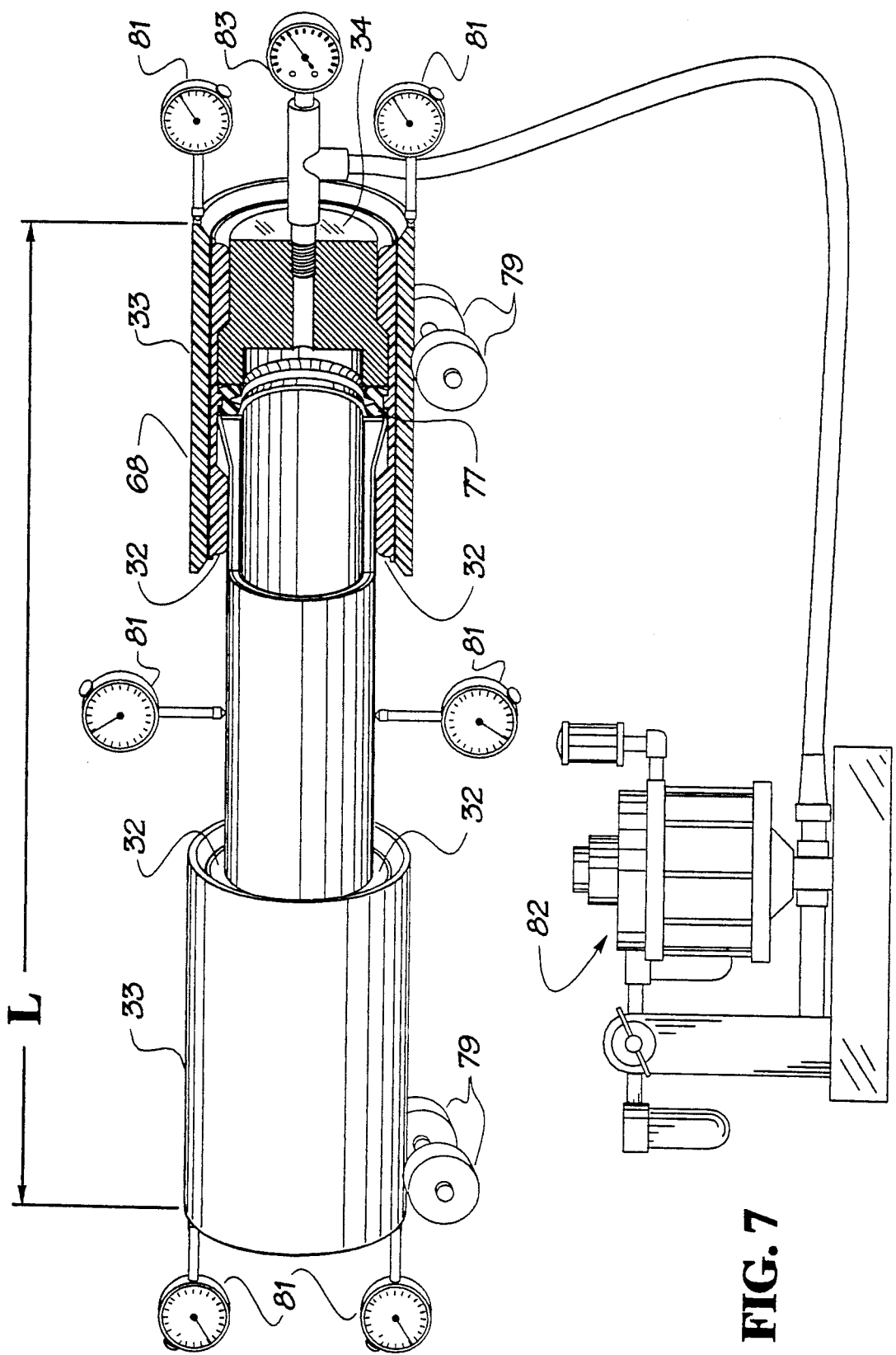
FIG. 7 is a schematic, fragmentary and partially sectioned view illustrating apparatus used to pressurize the pipe for measuring changes in pipe length, "L."

For burst testing purposes, a pipe having an inside diameter of 2.0 inches and a total wall thickness of 0.4 inch was assembled in the manner shown in FIG. 7. Passage 34a, formed through end plug 34 (FIG. 21), was used to fill the pipe with water while air was vented through passage 34a' of plug 34'. An internal "V" groove 87 is formed in each seal ring 77 (one shown in FIG. 7) so that when the sealed pipe is pressurized, the interior surfaces within the grooves will separate to increase the sealing compression and contact against each seal face 47 and each end plug. This procedure compensates for any potential long term loss of seal compression due to "compression set" normally produced by aging or by high temperature service environments that may also increase the seals' hardness.

When the pressure in the pipe is increased to approximately 10,000 psi (69 Mpa or 690 bar), the end load on the couplers will increase to about 96,211 lb (43,732 kg or 433 kN) and the hoop stresses imposed upon retaining sleeve 33 will increase. The thickness of circumferentially oriented filament strands 3 comprising the half coupler retaining sleeves is predetermined to accommodate the highest working pressure anticipated and assures that the separation between the mating half couplers and the space between the seal faces will not exceed that required to maintain sealing integrity. After the pipe has been pressurized to 10,000 psi, the internal pressure is reduced to zero and then rapidly pressurized to approximately 7,500 psi at a rate approximating 500 psi per second. This pressure test demonstrates that pipe 30 is able to resist pressure shock stresses associated with periodic "water hammer" pipeline events.

The stiffness of pipe 30 (as measured by its longitudinal tensile modulus of elasticity) can increase from 3,500,000 psi (24 GPa), to as much as 26,000,000 psi (176 GPa), when pressurized. To illustrate this unique feature, a twenty foot (6 m) long pipe, having a total wall thickness equal to 0.4 inches, was constructed according to the method outlined above. During a post-fabrication pressurization to 10,000 psi (69 Mpa), the total pipe elongation measured 0.3 inches (7.6 mm), a value that provided a longitudinal strain equal to 0.00125 in./in. (mm/mm). The longitudinal end load exerted on the pressurized pipe equaled 96,000 lb (43,700 kg).

Since the cross sectional area of annulus structure 31, comprising plies 36 and 37, resisting the end load equaled approximated 3.0 in$^2$ (19.3 cm$^2$), the longitudinal stress resisted by the annulus structure was determined to approximate 32,000 psi (220 Mpa). The effective longitudinal tensile modulus is calculated by dividing the longitudinal stress by the longitudinal strain. This value of 25,600,000 psi (177 Gpa) is nearly as great as the tensile modulus of steel (30,000,000 psi) and approximately seven times greater than the tensile modulus value of conventional filament wound glass reinforced thermosetting resin pipe material.

As illustrated in FIG. 12, this desirable high tensile modulus characteristic will function to reduce the overall elongation of the pipe and enables the compressible seal between pipe seal faces 47 to be used to accommodate the maximum pipe elongation thereby eliminating the need for pipe expansion loops in long pipe lines. The pressure-produced longitudinal tensile modulus value characterizing the composite double wall pipe constructed and pressurized in accordance with the teachings of this invention can be explained, as follows. When the matrix between the longitudinal strand cords and between the circumferentially oriented filament strands is uniformly fractured (microfractures 78 and 78', FIG. 6), the force that tends to increase the diameter of the pipe's second ply 37 also acts to increase the diameter of the pipe's third ply 36. The radial forces acting to increase the diameter of the third ply also function to shorten the length of the third ply and reduce the longitudinal strain imposed thereon.

In a similar manner, the end loads imposed on ply 36 will tend to compress and reduce the diameter of underlying ply 37. As a result, the end-loaded longitudinally-oriented strands 59, comprising third ply 36, will function to reduce the strain value of the circumferentially-oriented strands comprising second ply 37. The high tensile modulus behavior exhibited by the second ply structure enables the pipe inner wall diameter to remain unchanged and dimensionally constant over a wide pressure range.

Fabrication of Warp Ribbon 55

The following description relates to the preferred materials, apparatus and method shown in FIGS. 24 and 26 (station "C") for making drip-free warp ribbon 55, comprising second ply 37. The warp ribbon is composed of wet and dry continuous filament strands that produce a high strength laminate, reduce the laminate matrix weight and cost, increase the laminate glass to resin weight ratio, and eliminate the bothersome and costly squeegee operation conventionally used to remove surplus resin from filament wound material applied to a rotating forming mandrel.

Creel 53 supports center-pull packages 88 of continuous glass filament material for strands 40. As shown in FIG. 26-C, creel 53 is positioned to supply the strand material to adjacent filament winding matrix coater 54, placed between the creel and rotating pipe mandrel 42. Each center pull package may have an inside diameter approximating 6 inches (15 cm), an outside diameter of 11 inches (28 cm), a height of 10.5 inches (27 cm), a weight approximating 20 kg (44 lb) and comprises approximately 10,000 meters of glass strand roving having a yield of 225 yards per pound (452 m/kg). The roving filament count is approximately 2,000 filaments per strand and the filament diameter is 24 microns (0.00095 inches). The cross-sectional area of a single dry glass strand equals 0.001417 sq.in. (0.914 sq.mm). Each filament is made from E glass and is coated with a saline (silicone-based coating) coupling agent that serves to bind the matrix to the glass filament surface. The desired volume ratio of glass fiber to the resin matrix is two, so that one third of the cross-sectional area of a wet strand at least substantially equals the area of the resin matrix.

When impregnated with the desired amount of filament winding matrix resin 41, the cross-sectional area of each wet strand 56 averages 0.0022 square inches (1.42 sq.mm). A single wet strand is able to support as much as 275 pounds (125 kg) before breaking. This breaking strength is approximately double the ASTM D2992-A hydrostatic design basis strength (HDBS) value of 62,000 psi (428 Mpa). The preferred filament winding matrix resin is an isophthalic polyester resin having a viscosity of approximately 350 centipoise and containing approximately 45% styrene monomer, by weight. By using strands fed from thirty-six roving packages 88 and by using a strand spacing of 9 strands per inch of width, a 4.0 inches (10 cm) width of filament warp (ribbon) can be filament wound upon the mandrel. This provides a laminate ply thickness of approximately 0.020 inches (0.5 mm) for each wrap placed upon the mandrel.

To provide the desired matrix impregnation of each roving strand, the minimum dwell time for a filament strand to remain in a matrix coater is approximately one-half second. This impregnation efficiency results when the matrix depth in the coater pan is at least 9 inches (23 cm) and the strand speed through the coater is less than 36 inches (91 cm) per second. From FIG. 3, it can be seen that a pipe having a total wall thickness of 0.2 inches (5 mm) requires the filament wound thickness of second ply 37 to equal 0.10 inch (2.5 mm). This ply thickness can be produced by filament winding a sequence of five complete wraps of a 4 inch wide ribbon upon the mandrel. Using a mandrel diameter of 4 inches (10 cm) and a mandrel rotational speed of 120 revolutions per minute (2 rev/sec), the strand speed through matrix coater 54 equals 25 inches (64 cm) per second. By overlapping the filament winding ribbon and reducing the effective winding width to one fifth its original 4 inch width, the total thickness of the filament wound laminate can be achieved with a single wrap operation as the mandrel traverses past the matrix coater ribbon feed unit.

Assuming the mandrel's effective winding length is 20 feet (6 meters) and further assuming the effective ribbon winding width is 0.8 inches (2 cm), mandrel support dolly 43 must move past the ribbon feed unit at a rate of 1.6 inches (4 cm) per second if the mandrel rotation equals 120 rpm. Except for the beginning and ending 4 inch length of mandrel adjacent to each face ring, the required thickness of 0.1 inches can be filament wound upon the mandrel in approximately three minutes. In order to filament wind at this high speed, without losing any of the liquid matrix, it is necessary to employ the capillarity characteristics of the compacted dry filament strands 57. As shown in FIG. 24, this can be accomplished by making filament winding warp ribbon 55 from an alternating sequence of dry and wet strands. By using the dry filament strand capillarity feature, the surplus resin present on each wet filament strand 56 is rapidly absorbed and taken-up by one or more dry filament strands placed adjacent to and between wet strands.

Each strand 40 is initially guided through a series of creel-mounted strand guides 89 and 90 and to a horizontal dry strand comb 91, positioned above a stationary matrix coater pan 92. In an alternating sequence, alternate strands fed into the dry strand comb are pulled beneath a matrix impregnation bar 93, located at the bottom of the matrix coater pan. The strands are then pulled out of the pan so that the wet filament strands pass over a strand guide bar 94, located above the level of liquid matrix 41 and forward of matrix impregnating bar 93, from which they are then guided between a pair of horizontal squeegee bars 95 and under a strand collecting unit 96.

The remaining half of dry strands 57, fed into dry strand comb 91, are simultaneously pulled across the top of the coater and directly to and between horizontal squeegee bars 95 where they contact wet strands 56 and by their capillarity are impregnated with the liquid matrix 41 carried by the wet filament strands. Wet filament strands 56, along with the impregnated filament strands 57, comprise drip free ribbon warp 55 emerging from the squeegee bars. The ribbon warp is guided beneath filament strand collecting unit 96 to control the width of the filament winding ribbon wrapped upon the mandrel. The filament winding operation is completed when the leading edge of the ribbon contacts mandrel seal face ring 50 (FIG. 16), opposite the mandrel seal face ring where the winding operation began. The drip-free ribbon is then cut and dolly mounted mandrel 42 is moved to the next work Station "D" (FIG. 26) to provide room for the next-following pipe mandrel.

Fabrication of Strand-Cords 59

The following description relates to the preferred materials apparatus and method shown in FIGS. 15, 25 and 26 (Station "D") for making strand-cords 63 comprising third ply 36. The apparatus is similar to that shown in FIG. 24 and common structures are depicted by identical numerals.

A 0.3 inch (7.6 mm) total wall thickness was selected as the desired thickness for a double-wall composite pipe having an inner diameter of 6.0 inches (15.2 cm). From FIG. 3, the thickness of third ply 36 was found to be 0.1 inch (2.5 mm), i.e., one third of the total wall thickness. The number of anchor pins 64 (N) utilized on a six inch diameter pipe pin ring 64' (FIG. 15) was calculated by the formula: N=6*D, where "D" is the pipe's inside diameter in inches. Third ply 36 was made from a series of approximately parallel loops of strand-cords placed upon second ply 37. Each loop of strand cord was secured over one of the anchor pins, as shown in FIG. 15, and each strand cord comprised a multiplicity of strands of continuous glass filaments. A glass roving having a "yield" of 225 yards per pound was selected to comprise the continuous strand cord that was made into the loops and laced between the mandrel anchor pins b traversing strand-cord puller 61.

The total number of strands (NP) was calculated by the formula: NP=AL/AS, where "AS" is the cross sectional area of an individual strand of roving and "AL" was the cross sectional area of the longitudinally-oriented filament strands comprising third ply 36. The value of "AL" was calculated by the formula: AL=3.1416*(D+2TI+2TC+TL)*TL, where "D" was the pipe's inner diameter, "TI" was the wall thickness of first ply 38, "TC" was the wall thickness of second ply 37, and "TL" was the thickness of third ply 36.

From FIG. 3, the value of "TI" was found to equal 0.04 inches, (1.0 mm) and the value of "TC" equal to 0.13 inches (3.3 mm). For the six inch diameter pipe, AL=3.1416* (6.44)*0.1=2.02 in$^2$ (13.05 cm$^2$). The cross sectional area of an individual wet strand (AS) of a strand having a yield of 225 yards per pound, was 0.0022 in². The total number of ply strands (NP) comprising the third ply equalled 918 in accordance with the formula: AL/AS=2.02/0.0022=918 strands and the number of anchor pins 64 (N) equalled thirty-six. The number of strand cords (NC) equalled double the number of strand cord anchor pins. The number of continuous strands (NS), comprising each strand-cord loop, was calculated by the formula: NS=NP/NC=918/2*36=918/72=12.75 strands per strand-cord. Rounding-off to the next highest number yields thirteen glass strands per strand-cord.

As illustrated at Station D in FIG. 26, creel 53 is capable of supporting at least thirteen center-pull packages 88 to supply adjacent strand-cord matrix coater 6 with the strand material. The liquid matrix 41 (FIG. 25) selected constituted an isophthalic polyester resin having a viscosity of approximately 350 centipoise. To provide the desired matrix impregnation of each roving strand, the minimum dwell time for the filament strands, comprising strand cord 63, to remain in matrix coater pan 92, was one-fourth second. This dwell time was determined for an apparatus wherein the matrix depth in the coater pan is at least 9 inches (23 cm) and the strand speed through the coater is less than 72 inches (182 cm) per second.

Dry filament strands 40 were pulled from thirteen center-pull strand supply packages 88, supported by creel structure 53. Each strand was fed through a respective strand guide 89 and 90, located above each strand supply package, and then fed through a horizontal circular strand collecting ring 97, located above strand matrix coater pan 92 positioned at an axle removal end 84 of the mandrel (FIG. 26). The collected dry continuous filament strands were then fed into matrix coater pan 92 and guided under a horizontal rotatable impregnating bar 98 located near the bottom of the matrix coater pan. The impregnated filament strands were then fed through an adjustable roller apparatus 99 from which they were then guided to strand-cord forming unit 60.

Unit 60 preferably comprises two pairs of equally spaced and parallel rotatable bars that are transversely disposed relative to each other (FIG. 25) to define a low-friction cord-forming exit opening 60'. The opening had a cross sectional area of 0.0286 square inches which was equal to the total cross-sectional area of the thirteen wet filament strands comprising strand cord 59. To obtain this cord cross-sectional area, the spacing between each of the two pairs of rotatable bars was set at 0.169 inches.

As shown in FIG. 15, strand cord 59 is then fed from cord-forming unit 60 between the pulleys of axially-traversing strand-cord pulling and placement unit 61, having a width of approximately 0.25 inches that enables it to periodically move between the upper-most two anchor pins 64 located on either pin ring 64', as shown in FIG. 15. Leading end 63 of strand-cord 59 is initially tied to an anchor pin to accommodate formation of the first and subsequent loops 63' of the strand-cord as it is pulled from strand-cord forming unit 60. As strand-cord puller unit 61 traverses from one end of the rotating mandrel to the other, a sequence of strand cord loops 63' are thus formed and the pipe is thereafter completed in the manner described above.

Preferred Pipe Design Parameters

The following discussion and FIG. 11 relate to preferred design parameters (dimensional, physical, etc.) for above-described pipe 30. Some discussion is repetitive, but deemed necessary to stress its importance.

Coupling flange 70 preferably has an outer diameter (ODF) that is at least approximately 1.46 inches (37 mm) greater than an inner diameter of pipe 30 and the total wall thickness of the pipe (T) is preferably within the approximate range of from 0.1 to 0.4 inch (2.54 mm to 10.12 mm). When the pipe's total wall thickness exceeds 0.4 inches (10.2 cm), the outer diameter of the flange will then substantially equal the inner diameter of the pipe (ID) plus a quantity, "DE", where "DE" equals 1.46 inches plus twice the quantity T−0.4 inch, as expressed by the formula: ODF−ID+1.46+2*(T−0.4) inches. Further, the pipe may have a total wall thickness that is evenly divisible by 0.05 inch and can be selected form the range of from 0.05 inch to 1.00 inch.

The thickness of third ply 36 preferably equals at least approximately one third of the total wall thickness of the pipe. Terminus portions of plies 36–39 are preferably constructed at at least one end of the pipe to provide annular coupling flange 70 where the thickness of second ply 37 (TC), in inches, is determined from the formula: TC=P*ID/2SC, where "P" is a maximum pipe test pressure, in psi, "ID" is the inside diameter of said pipe, in inches, and "SC" is the maximum allowable tensile strength of the second ply. Maximum pipe test pressure is governed by the wall thickness of third ply 36 (TL) and is determined from the formula: P=EL/A, where "A" (square inches) is the cross-sectional area of pipe flange 70 in accordance with the formula: A=(ODF) 2*0.7854, where "ODF" is the outside diameter of the pipe flange and "EL" is the maximum end load, in pounds, that can be resisted by the third ply structure connected at the pipe flange. The maximum end load, "EL", measured in pounds, is determined from the formula: EL=SL*TL*3.1416*DL, where "TL" is the wall thickness of the third ply in inches, "DL" is the diameter of the third ply, and "SL" is the transverse shear strength of the third ply, measured in psi. The maximum design tensile strength of second ply 37 is preferably at least about 50,000 psi (345 Mpa) and the maximum design transverse shear strength of third ply 36 is at least about 35,000 psi (241 Mpa). "DL" preferably equals ID+2 (TC+TI)+TL.

Referring to FIGS. 11 and 12, the uncompressed axial width of seal ring 77 (CW), measured between its sealing edges, may equal about 1 inch (25.4 mm) for many of the pipe applications under consideration and an outside diameter of the seal ring at least approximately equals the inside diameter of the coupler means (ODF). The axial distance between respective base portions of the coupler flanges (CD) is determined from the formula: CD=CW+2 FL, where "CW" equals the compressed width of the seal ring contacting the seal faces, and "FL" equals the length of pipe flange 70, as measured from a base of the pipe flange to a seal face 47. The compressed width of the seal ring, between the seal faces of two adjacent pipes, may range from about 60 to about 90 percent of the uncompressed width of the seal ring.

An outer diameter of the coupling, comprising half couplers 32, may approximate in the range of from 0.01 to 0.04 inch (0.25 to 1 mm) less than an inner diameter of retaining sleeve 33. Retaining sleeve 33 may comprise a first sleeve ply composed of a filament-reinforced inner laminate having longitudinally oriented continuous filaments impregnated with a hardenable liquid polymer and a second sleeve ply composed of circumferentially oriented filament reinforcements impregnated with a hardenable thermosetting resin matrix. The thickness of the first sleeve ply may be within the approximate range of 0.020 to 0.10 inch (0.5 mm to 2.5 mm) and the thickness of the second sleeve ply may be within the range of 0.2 to 1.0 inch (5 mm 25.4 mm). The filaments composing the various plies may comprise continuous filaments of glass made into strands having a yield in the range of from 50 to 650 yards per pound and filament diameters in the range of from 10 to 25 microns.

Industrial Applicability

Although the above-described double-wall composite structure, apparatus and method are particularly useful for pipeline systems for transporting fluids, it should be understood that various features thereof can be applied to other composite structures, such as storage tanks and building structures.

One proposed industrial application of the double-wall composite pipe of this invention is its utilization in a pipeline system for transporting water from Alaska to California, U.S.A. In particular, the possibility of building a seventeen hundred mile sub-sea water pipeline between an Alaskan river and Lake Shasta in Northern California is being explored. It has been determined that the project would cost approximately $150 billion and take fifteen years to complete should conventional steel pipe, buried in concrete, be used for this purpose.

Applicant has determined that the double-wall composite pipe embodying this invention could be utilized for such a water transport system at a substantially reduced cost approximating $20 billion and over a reduced ten year installation period. A sub-sea pipeline system utilizing this invention would take advantage of the fact that fresh water is less dense and, hence, more buoyant than salt water. The pipeline system would thus float under water and would be attached to the sea's floor by a suitable anchoring system. Unlike steel, the resin reinforced fiberglass composing the pipeline system would resist rust and salt corrosion. The mechanical coupling system, connecting adjacent pipe sections together, would provide sealing capabilities and service life expectancy greater than that exhibited by welded steel pipes.

In order to deliver four million acre feet of water annually, pumping stations would be required approximately every 150 miles for a land-based pipeline. However, the Coriolis effect, by which the earth's rotation deflects ocean currents, may help push the water along a sub-sea pipeline system to provide a relative reduction in energy demands.

As shown in FIG. 8, a bore 100 can be drilled radially through the pipe to intersect groove 85 at selected ones of coupling assemblies 68 for a particular pipeline system. A standard leak detector 101 can be mounted in the bore to detect any leaks occasioned by a rupture hole 102 or the like. The detector is particularly useful for pipeline systems adapted to transport highly toxic-fluids. An elastomeric and flexible boot 103 can be utilized to cover, seal and protect coupling assembly 68. The boot is suitably secured, such as by adhesive bonding, to outer ply 39 on either side of the coupling assembly.

I claim:

1. A tubular structure comprising
   a plurality of plies composed of filaments and hardenable adhesive means impregnating said filaments for forming hardened matrixes for said plies, and
   means, including multitudes of microfractures, in at least one of said plies for preconditioning said tubular structure to inhibit fluid leakage therethrough and to resist and absorb, without rupture, internal operating pressures and high strain-rate stresses resulting from impact and hydrostatic shock loads imposed thereon.

2. The tubular structure of claim 1 wherein said structure is disposed on a longitudinal axis thereof and said plies comprise
   an impermeable first ply composed of a filament-reinforced thermosetting polymeric first resin,
   a permeable second ply surrounding said first ply and composed of circumferentially oriented continuous filament reinforcements embedded in a frangible first matrix, said last-mentioned means comprising a first multitude of circumferentially oriented microfractures,
   a permeable third ply surrounding said second ply and composed of longitudinally oriented continuous filament reinforcements embedded in a frangible second matrix, said last-mentioned means further comprising a second multitude of longitudinally oriented microfractures, and
   an impermeable fourth ply surrounding said third ply and composed of a filament-reinforced thermosetting polymeric second resin.

3. The tubular structure of claim 2 wherein each of said first and second resins comprise an elastomeric epoxy resin.

4. The tubular structure of claim 2 wherein each of said first and second matrixes comprises a hardenable soluble silicate having a viscosity approximating 100 centipoise.

5. The tubular structure of claim 2 wherein at least one terminus portion of said first ply forms an annular seal face extending radially outwardly from said axis to have an outer diameter at least approximately equal to an inner diameter of said third ply.

6. The tubular structure of claim 2 wherein terminus portions of said second, third and fourth plies are constructed at at least on end of said tubular structure to provide an external pipe flange terminating at a seal face at an end of said structure.

7. The tubular structure of claim 6 wherein said pipe flange is annular and has an outer diameter that is at least approximately 1.46 inches (37 mm) greater than an inner diameter of said tubular structure, the wall thickness of said tubular structure being in the approximate range of from 0.1 to 0.4 inches (2.54 mm to 10.12 mm).

8. The tubular structure of claim 7 wherein said wall thickness, "T", exceeds 0.4 inches (10.2 mm) and the outer diameter of said flange, "ODF", at least substantially equals the inner diameter of said tubular structure, "ID", plus a quantity, "DE", wherein "DE" equals 1.46 inches plus twice the quantity T−0.4 inches, as expressed by the formula: ODF=ID+1.46+2(T−0.4) inches.

9. The tubular structure of claim 5 wherein a terminus portion of said third ply is disposed on a conical ramp structure and is surmounted by a filament wound flange ring structure.

10. The tubular structure of claim 2 wherein said tubular structure comprises a pipe having a total wall thickness that is evenly divisible by 0.05 inches and wherein said wall thickness is selected from the range of from 0.05 inch to 1.00 inch.

11. The tubular structure of claim 10 wherein the thickness of said third ply equals at least approximately one third of the said total wall thickness.

12. The tubular structure of claim 10 wherein terminus portions of said second, third and fourth plies are constructed at at least one end of said pipe to provide an annular pipe flange and where the thickness, in inches, of said second ply, "TC", is determined from the formula: TC=PD/2C, where "P" is a maximum pipe test pressure, in psi, "D" is the inside diameter of said pipe, in inches, and "SC" is the maximum allowable tensile strength of said second ply and wherein said maximum pipe test pressure is governed by the wall thickness, "TL", of said third ply and is determined from the formula: P=EL/A, where "A" (square inches) is the area of said pipe flange and equals 0.7854 times the square of the outside diameter of said pipe flange (ODF) and "EL" is the maximum end load, in pounds, that can be resisted by said third ply at said pipe flange, and wherein the maximum end load, "EL", measured in pounds, is determined from the formula EL=SLxTLx3.146xODF, where "TL" is the wall thickness of said third ply in inches, and "SL" is the transverse shear strength of said third ply measured in pounds per square inch.

13. The tubular structure of claim 12 wherein the maximum tensile strength of said second ply is at least about 50,000 psi (345 Mpa) and the transverse shear strength of said third ply is at least about 35,000 psi (241 Mpa).

14. The tubular structure of claim 6 further comprising coupling means for connecting and sealing the pipe flanges of two of said tubular structures together comprising a pair of semi-cylindrical half couplers and a retaining sleeve means for covering said half couplers and holding said half couplers in locking engagement with said pipe flanges to prevent axial displacement of said tubular structures relative to each other.

15. The tubular structure of claim 14 wherein a pair of said tubular structures are aligned longitudinally and said coupling means further comprises elastomeric sealing means for sealing opposed seal faces of said connected tubular structures, including sealing of said first and fourth plies.

16. The tubular structure of claim 15 wherein said sealing means comprises a seal ring having first groove means formed internally thereon and a plurality of second groove means formed on each lateral side thereof for providing a multi-edge contact seal between said seal faces and said seal ring when said seal faces move towards each other in response to an increase in the length of one or both of said tubular structures and in response to thermal or pressure stresses experienced by said connected tubular structures.

17. The tubular structure of claim 16 wherein said seal ring has an annular groove formed on the periphery thereof and said half couplers each have a semi-circular flange formed thereon adapted to mate within said groove for preventing said seal ring from twisting or warping during assembly of said half couplers within said retaining sleeve means.

18. The tubular structure of claim 16 wherein an uncompressed width of said seal ring, measured at its annular sealing edge equals about 1 inch (25.4 mm) and an outside diameter of said seal ring at least approximately equals the inside diameter of said coupler means.

19. The tubular structure of claim 14 further comprising means formed internally on said half couplers for guiding the assembly of said half couplers within said retaining sleeve means.

20. The tubular structure of claim 15 further comprising coupler flange means formed internally on said half couplers for engaging and connecting the pipe flanges of said tubular structures together to prevent axial separation thereof.

21. The tubular structure of claim 20 where the distance between respective base portions of said coupler flange means, "CD", is determined from the formula: CD=CW+2 FL, where "CW" equals the compressed width of said sealing means contacting said seal faces, and "FL" equals the length of each said pipe flange as measured from a base of said pipe flange to said seal face.

22. The tubular structure of claim 15 wherein the compressed width of said seal ring between the seal faces of said structures equals at least about 60 to 90 percent of the uncompressed width of said seal ring.

23. The tubular structure of claim 15 further comprising flexible boot means for enclosing and sealing said coupling means and means for securing said boot means to said connected structures on either side of said coupling means.

24. The tubular structure of claim 14 wherein an outer diameter of said coupling means is approximately in the range of 0.01 to 0.04 inches (0.25 to 1 mm) less than an inner diameter of said retaining sleeve means.

25. The tubular structure of claim 24 wherein said retaining sleeve means comprises a first sleeve ply composed of a filament-reinforced inner laminate having longitudinally oriented continuous filaments impregnated with a hardenable liquid polymer and a second sleeve ply composed of circumferentially oriented filament reinforcements impregnated with a hardenable thermosetting resin matrix.

26. The tubular structure of claim 25 where the thickness of said first sleeve ply is in the approximate range of 0.020 to 0.10 inch (0.5 mm to 2.5 mm) and the thickness of said second sleeve ply is in the approximate range of 0.2 to 1.0 inch (5 mm to 25.4 mm).

27. The tubular structure of claim 1 where said filaments comprise continuous filaments of glass made into strands having a yield in the range of 50 to 650 yards per pound and filament diameters in the range of 10 to 25 microns.

28. The tubular structure claim 14 further comprising leak-detecting sensor means for detecting fluid leakage emerging from said permeable third ply.

* * * * *